United States Patent
Foster et al.

(10) Patent No.: US 10,525,783 B1
(45) Date of Patent: Jan. 7, 2020

(54) SUSPENSION SYSTEM

(71) Applicant: RF Products, Inc., Batesville, AR (US)

(72) Inventors: Robert N. Foster, Batesville, AR (US); Adam E. Branscum, Batesville, AR (US)

(73) Assignee: RF Products, Inc.

( * ) Notice: Subject to any disclaimer, the term of this patent is extended or adjusted under 35 U.S.C. 154(b) by 0 days.

(21) Appl. No.: 15/701,659

(22) Filed: Sep. 12, 2017

Related U.S. Application Data

(63) Continuation-in-part of application No. 14/919,638, filed on Oct. 21, 2015, now abandoned.

(51) Int. Cl.
*B60G 13/00* (2006.01)
*B60N 2/50* (2006.01)
(Continued)

(52) U.S. Cl.
CPC .......... *B60G 13/005* (2013.01); *A01D 34/64* (2013.01); *B60G 3/20* (2013.01); *B60G 7/001* (2013.01);
(Continued)

(58) Field of Classification Search
CPC ... B60G 3/08; B60G 3/20; B60G 3/22; B60G 3/24; B60G 3/26; B60G 11/14; B60G 11/16; B60G 11/22; B60G 11/23; B60G 11/24; B60G 2204/13; B60G 2204/1302; B60G 2204/124; B60G 2204/125; B60G 2204/45; B60G 2204/4502; B60G 2204/43; B60G 2204/4307; B60G 2206/601;
(Continued)

(56) References Cited

U.S. PATENT DOCUMENTS 1,678,662 A * 7/1928 Wilson ............... B60G 11/14
267/253
1,998,641 A * 4/1935 Shaw ............... B60G 3/26
267/259
(Continued)

*Primary Examiner* — Laura Freedman
(74) *Attorney, Agent, or Firm* — Joe D. Calhoun

(57) ABSTRACT

The invention disclosed herein comprises a vehicle having improved suspension systems for wheels, motorized wheels and the seat of the user. The wheel suspension system includes a sleeve housing a non-round core snugly surrounded by an elastomeric shock-absorption material. Since both ends of the sleeve have downstanding arms forming the "forks" supporting a caster axle, irregularities in the terrain encountered by the caster exert torsion upon the core; embedding the core in elastomeric material dampens the shock. The suspension system for the wheel assembly (including any motorized drive shaft) essentially includes pivot-mounting the wheel assembly (wheel-motor) beneath the chassis frame, so that irregularities in the terrain encountered by the drive wheel cause the wheel assembly to flex inwardly (for bumps) or outwardly (for holes); in the resting position there is an elastomeric bumper or compression spring horizontally mounted adjacent to a stop-plate on the pivoting cradle carrying the wheel assembly (or wheel-motor), so that further inward flexion is dampened. The seat suspension system includes elastomeric bumpers essentially acting as fulcrums, to dampen shock by absorbing it directly and by cantilevering the seat for further shock absorption.

17 Claims, 38 Drawing Sheets

(51) Int. Cl.
*B60G 11/16* (2006.01)
*B60G 7/00* (2006.01)
*B60G 3/20* (2006.01)
*B60G 11/24* (2006.01)
*A01D 34/64* (2006.01)

(52) U.S. Cl.
CPC .............. *B60G 11/16* (2013.01); *B60G 11/24* (2013.01); *B60G 13/003* (2013.01); *B60N 2/502* (2013.01); *B60G 2200/144* (2013.01); *B60G 2200/422* (2013.01); *B60G 2204/124* (2013.01); *B60G 2204/125* (2013.01); *B60G 2204/13* (2013.01); *B60G 2204/1302* (2013.01); *B60G 2204/43* (2013.01); *B60G 2204/4307* (2013.01); *B60G 2204/45* (2013.01); *B60G 2204/4502* (2013.01); *B60G 2206/601* (2013.01); *B60G 2206/73* (2013.01); *B60G 2300/084* (2013.01)

(58) Field of Classification Search
CPC .......... B60G 2206/73; B60G 2300/084; B60G 13/003; B60G 13/005; B60G 13/04; B60G 7/001; B60G 7/02; B60G 7/04; B60G 2200/422; A01D 67/00; A01D 67/005
See application file for complete search history.

(56) References Cited

U.S. PATENT DOCUMENTS

| | | | | |
|---|---|---|---|---|
| 2,182,248 | A * | 12/1939 | Chayne | B60G 9/00 180/352 |
| 2,549,320 | A * | 4/1951 | Makin | B60G 11/14 267/251 |
| 2,705,646 | A * | 4/1955 | Herregarden | B60G 11/14 267/253 |
| 3,495,848 | A * | 2/1970 | Hickman | B60G 9/04 267/257 |
| 4,690,428 | A * | 9/1987 | Fluegge | B60G 11/16 267/292 |
| 5,080,389 | A * | 1/1992 | Kawano | B60G 3/20 280/124.142 |
| 5,704,632 | A * | 1/1998 | Lee | B60G 15/067 280/124.128 |
| 6,959,936 | B2 * | 11/2005 | Anderson | B60G 9/02 280/124.11 |
| 7,107,746 | B2 * | 9/2006 | Melone | A01D 34/64 56/15.8 |
| 7,128,327 | B2 * | 10/2006 | Kawamata | B60G 7/006 280/124.106 |
| 8,727,363 | B1 * | 5/2014 | VanDenberg | B60G 11/225 267/273 |
| 9,730,386 | B1 * | 8/2017 | Covington | A01D 34/64 |
| 2013/0291508 | A1 * | 11/2013 | Melone | B60G 9/00 56/14.7 |

* cited by examiner

SUSPENSION SYSTEM

CROSS REFERENCE TO RELATED APPLICATIONS

This application claims the benefit of priority of U.S. utility patent application Ser. No. 14/919,638 filed 21 Oct. 2015, which is incorporated herein by reference.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The present disclosure relates to the field of suspension and shock absorption systems. More particularly, the invention disclosed herein relates to systems absorbing vibration and shock to any wheel (motorized or not), to any motorized wheel, and to the seat of a user of the vehicle. The present invention relates especially to riding mowers, all terrain vehicles, recreational off-highway vehicles and utility task vehicles.

(2) Background of Invention

The following are arguably material to patentability of the invention disclosed herein.

| U.S. Pat./application Ser. No. | 1st Named Inventor | Date of Patent/Publication |
|---|---|---|
| 7,708,292 | Foster | 4 May 2010 |
| 6,857,254 | Melone | 22 Feb. 2005 |
| 5,979,920 | Krakowiak | 9 Nov. 1999 |
| 5,899,470 | Heitzman | 4 May 1999 |
| 4,559,669 | Bonzer | 14 Dec. 1985 |
| 4,486,030 | Takata | 4 Dec. 1984 |
| 3,669,467 | Dunlap | 13 Jun. 1972 |

One of the present inventors was the inventor on U.S. Pat. No. 7,708,292, listed above. That patent discloses the use of elastomeric "pillows" interposed between the front caster's axle bracket and forks connecting the wheel assembly to the vehicle frame, held in place by a fastener adapted to limit movement of the wheel assembly. For the rear wheel suspension, this patent discloses a rear axle housing mounted transverse to the longitudinal axis of the frame, and includes parallel frame rails supporting the rear wheel assemblies; the vibration damping system includes at least one elastomeric pillow interposed between the frame and the rear wheel assembly, held in place by a fastener adapted to limit movement of the wheel assembly. This patent discloses traditional purely-vertical buffering accomplished by a resilient pillow rather than a spring. One of several distinctions between the invention disclosed herein and that disclosed in this patent is the elastomeric dampener and fastener of the present invention does not limit the downward movement of the wheel; nor is it interposed between the frame and a wheel within the disclosure of this patent.

As to the disclosed suspension system for absorbing vibration and shock to any wheel (motorized or not), the torsion axle disclosed at http://www.dexteraxle.com/video_gallery is arguably material. That reference discloses a torsion-arm type of suspension for trailer wheels, self-contained within the axle tube. The trailer wheel's axle attaches to a pivot-arm that connects to the axle tube in a parallel plane. Within the axle tube is a steel bar having a square cross section; there are also four rubber cords interfacing with each flat side of the steel bar, to buffer axial rotation of the steel bar caused by displacement of the wheel by bumps or holes in the terrain. However, this axle does not allow for varying the amount of dampening, nor does it allow for easy maintenance and replacement of the dampener.

BRIEF SUMMARY OF THE INVENTION

In most general terms, the invention disclosed herein comprises a combination of suspension systems (or subsystems) that provides the user of a vehicle (such as a riding mower) vibration dampening which significantly reduces shock and vibration caused by the movement of the vehicle over uneven or irregular terrain. The invention disclosed herein is essentially, independently or in combination, improved suspension systems for non-motorized wheels, motorized wheels and the seat of the user.

DETAILED DESCRIPTION OF THE INVENTION

Figure 1:
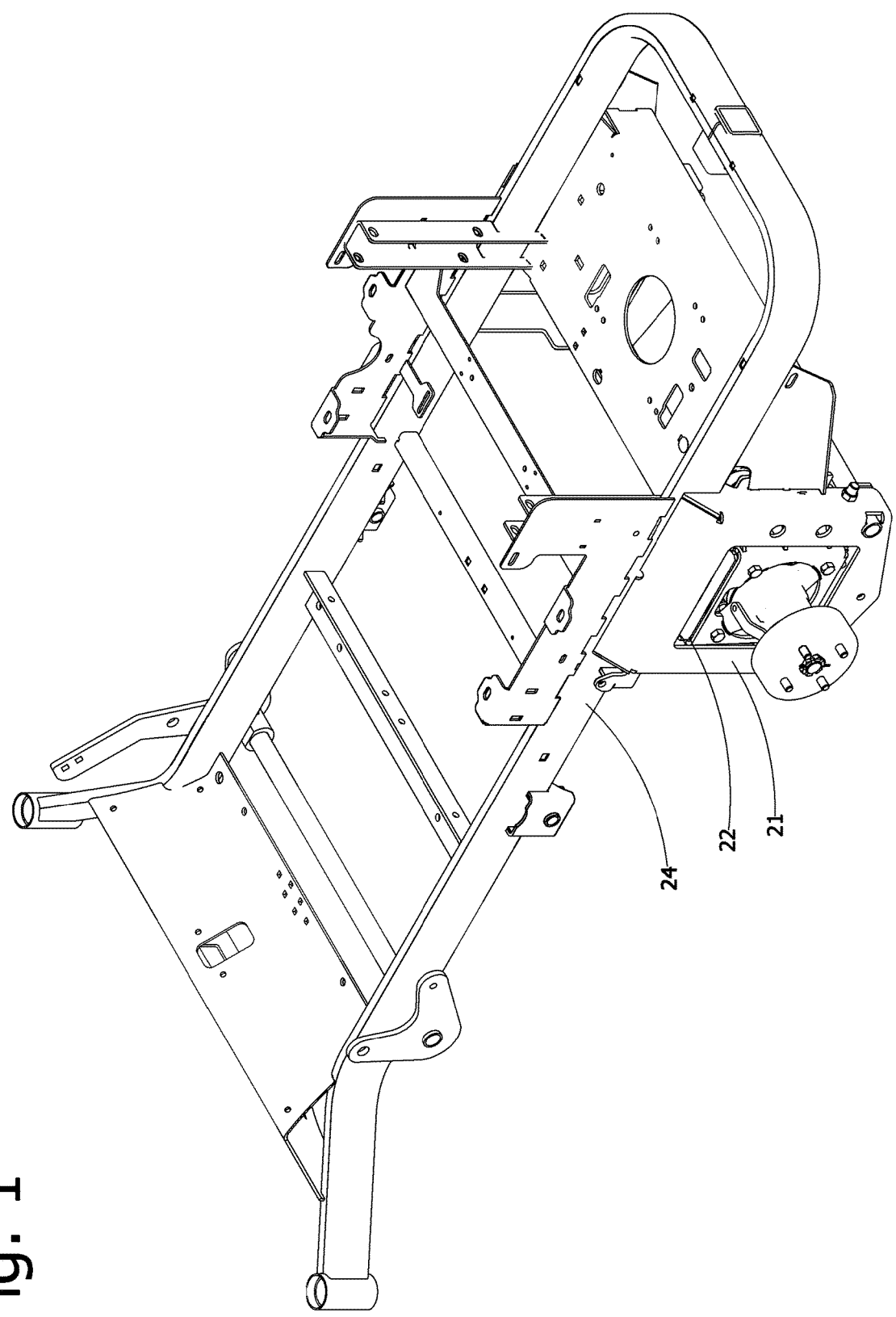
FIG. 1 depicts a perspective view of a representative sample of a vehicle chassis including a left drive wheel suspension system; the companion right drive wheel suspension is essentially a mirror image thereof, and both may be coupled by way of a pulleys connected by a belt (not shown).

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that such materials satisfy the structural and/or functional requirements. For example, any material may be used so long as it satisfies the rigid, resilient and/or durable structural and functional requirements for which it is being used.

It is an object of the present invention to provide a non-drive wheel suspension system that improves the dampening of shock, while allowing the easy selection of dampening characteristics and remaining readily serviceable to maintain or replace dampening elements.

Another object of the invention is to provide a drive wheel suspension system that improves the dampening of shock while allowing the easy selection of dampening characteristics and remaining readily serviceable to maintain or replace dampening elements.

Another object of the invention is to provide a drive wheel suspension system that improves the dampening of shock while reducing the risk de-coupling any belt coupling the drive wheel motor to another motive element of the vehicle.

Another object of the invention is to provide a wheel suspension system that allows minimum vertical movement of the pulley, to enable use of an integrated wheel-and-pump.

Another object of the invention is to provide a seat suspension system that improves the dampening of shock while allowing the easy selection of dampening characteristics and remaining readily serviceable to maintain or replace dampening elements.

Another object of the invention is to provide a seat suspension system that allows ready adjustment for different users within a weight range of up to approximately 300 pounds.

Other objects of the invention will become clear upon a review of the disclosure herein.

The wheel suspension system for non-drive wheels includes a sleeve housing a non-round core snugly surrounded by an elastomeric shock-absorption material. Since both ends of the sleeve have downstanding arms forming the "forks" supporting a caster axle, irregularities in the terrain encountered by the caster exert torsion upon the core; embedding the core in elastomeric material dampens the shock. The suspension system for the motorized drive shaft essentially includes pivot-mounting the wheel-motor beneath the chassis frame, so that irregularities in the terrain encountered by the drive wheel cause the wheel assembly to flex inwardly (for bumps) or outwardly (for holes); in the resting position there is an elastomeric bumper horizontally mounted adjacent to a stop-plate on the pivoting cradle carrying the wheel-motor, so that further inward flexion is dampened. An alternative embodiment to this system includes substituting at least one compression spring or similarly functioning structure for each elastomeric bumper; each spring may be anchored at its interior end in a manner similar to the replaced bumper or, preferably, each end of the spring may be impaled upon a separate guide structure such as when the guide structure is inserted into the essentially cylindrical cavity formed by the spring. Moreover, this system may be used for non-motor-driven wheel assemblies in which the wheel has a similar pivot-mounting. The seat suspension system includes elastomeric bumpers essentially acting as fulcrums, to dampen shock by absorbing it directly and by cantilevering the seat for further shock absorption.

The typical riding mower has a chassis supported by a pair of front wheel assemblies and a rear axle assembly having rear wheel assemblies. The chassis supports a mower deck and a seat for a driver; typically there are a pair of steering arms within easy reach. A motor compartment rides on the frame and provides motive power to the mower.

Figure 14:
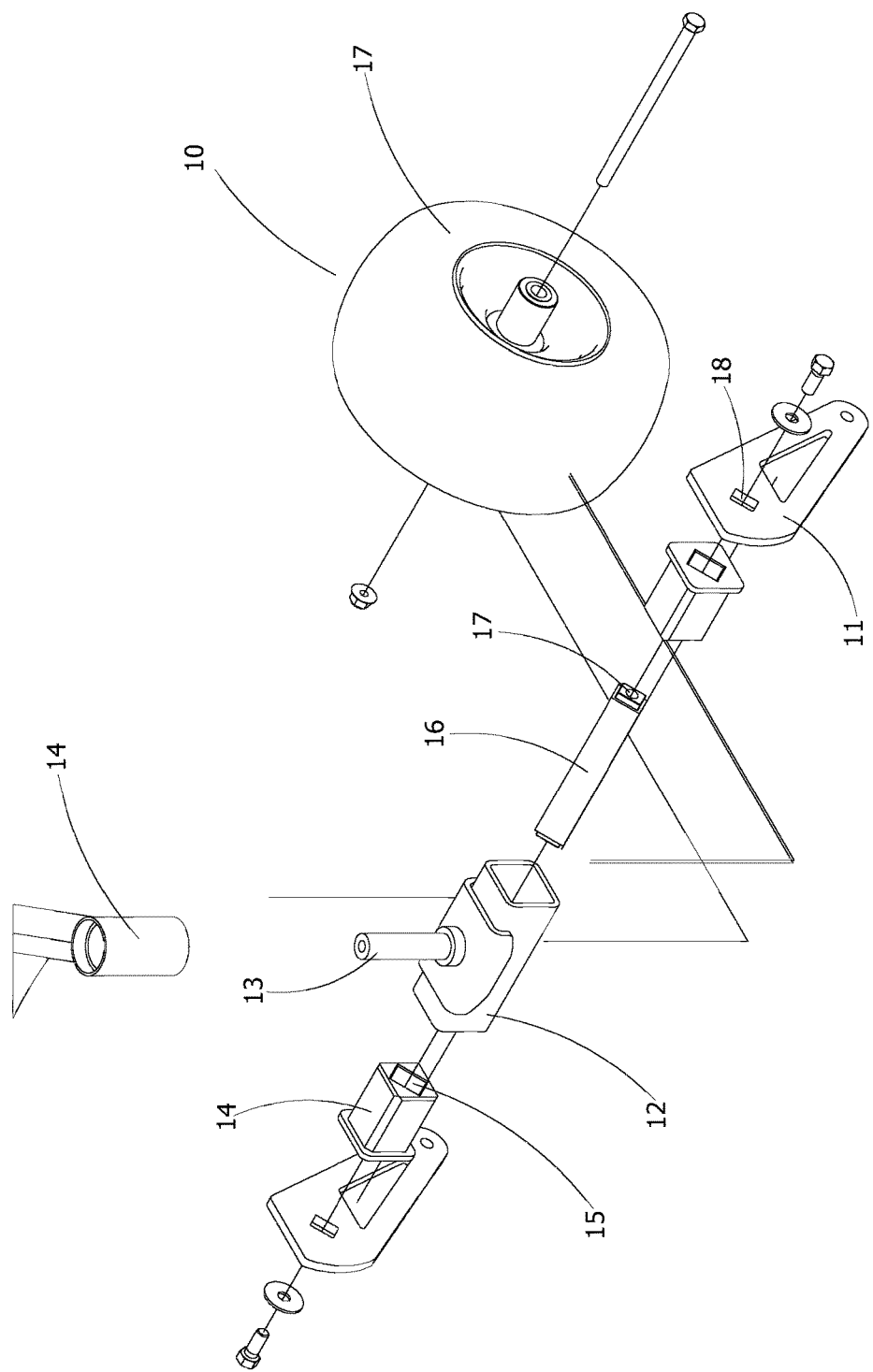
FIG. 14 depicts parts and exploded view of the material in circle 13 of FIG. 12.
Figure 15:
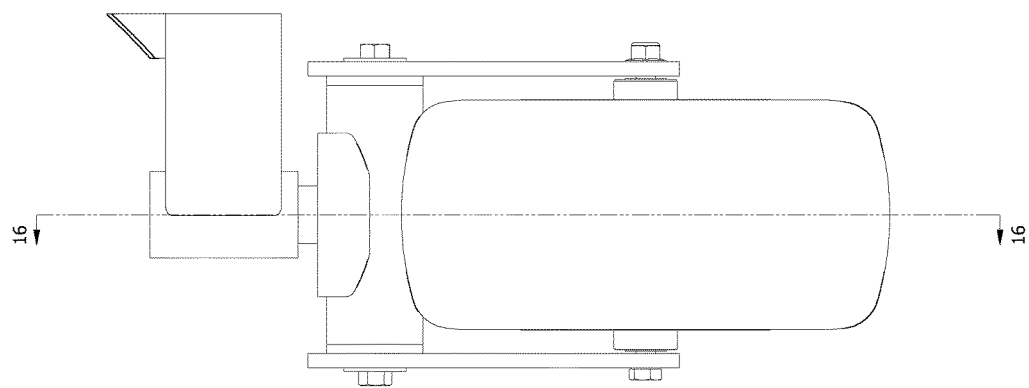
FIG. 15 depicts a rear elevation view of the non-drive wheel suspension system of FIG. 13.
Figure 16:
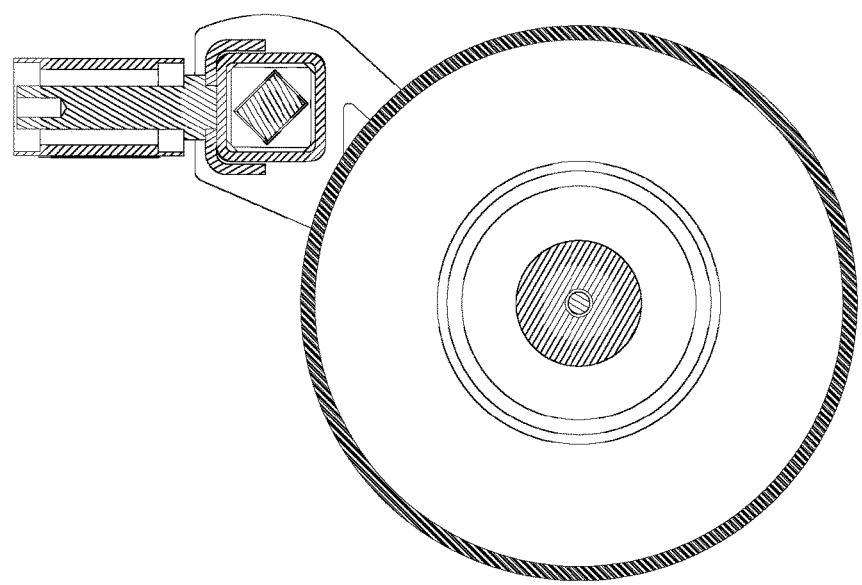
FIG. 16 depicts a cross section view of the non-drive wheel suspension system of FIG. 13, at plane 16-16 of FIG. 15.
Figure 17:
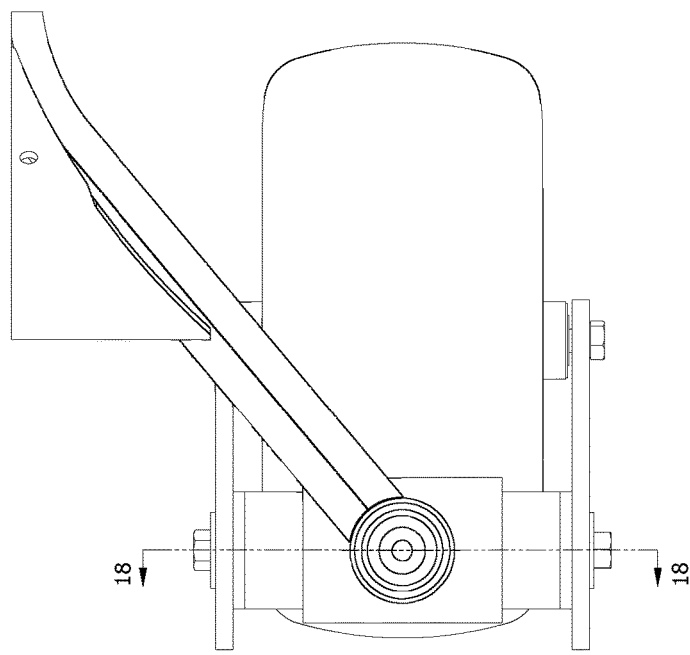
FIG. 17 depicts a top plan view of the non-drive wheel suspension system of FIG. 13.
Figure 18:
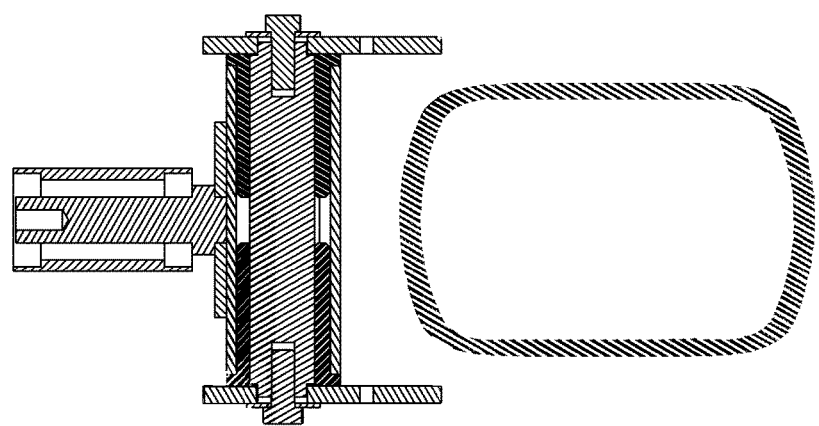
FIG. 18 depicts a cross section view of the non-drive wheel suspension system of FIG. 13, at plane 18-18 of FIG. 17.
Figure 19:
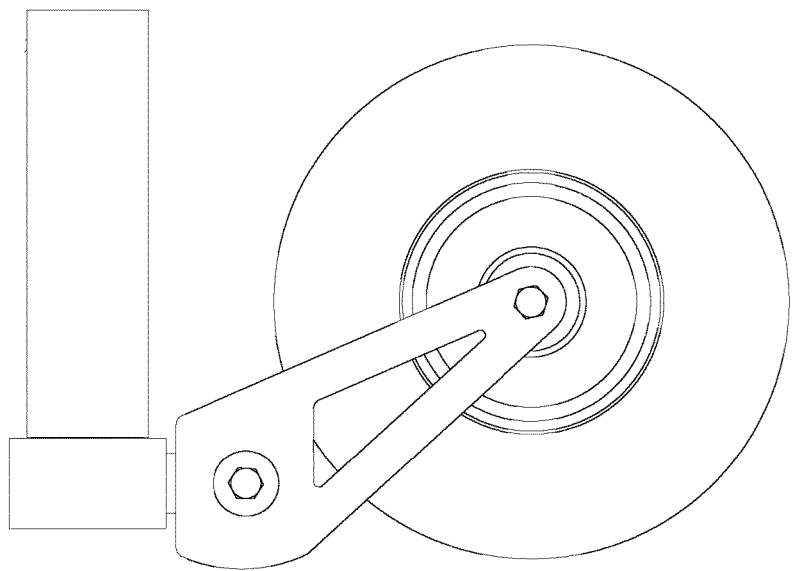
FIG. 19 depicts a left side elevation view of the non-drive wheel suspension system of FIG. 13.
Figure 20:
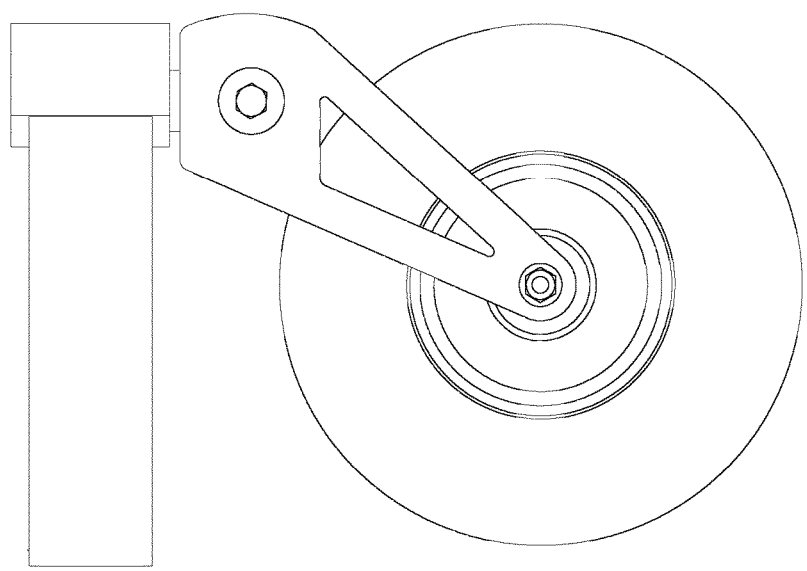
FIG. 20 depicts a right side elevation view of the non-drive wheel suspension system of FIG. 13.
Figure 21:
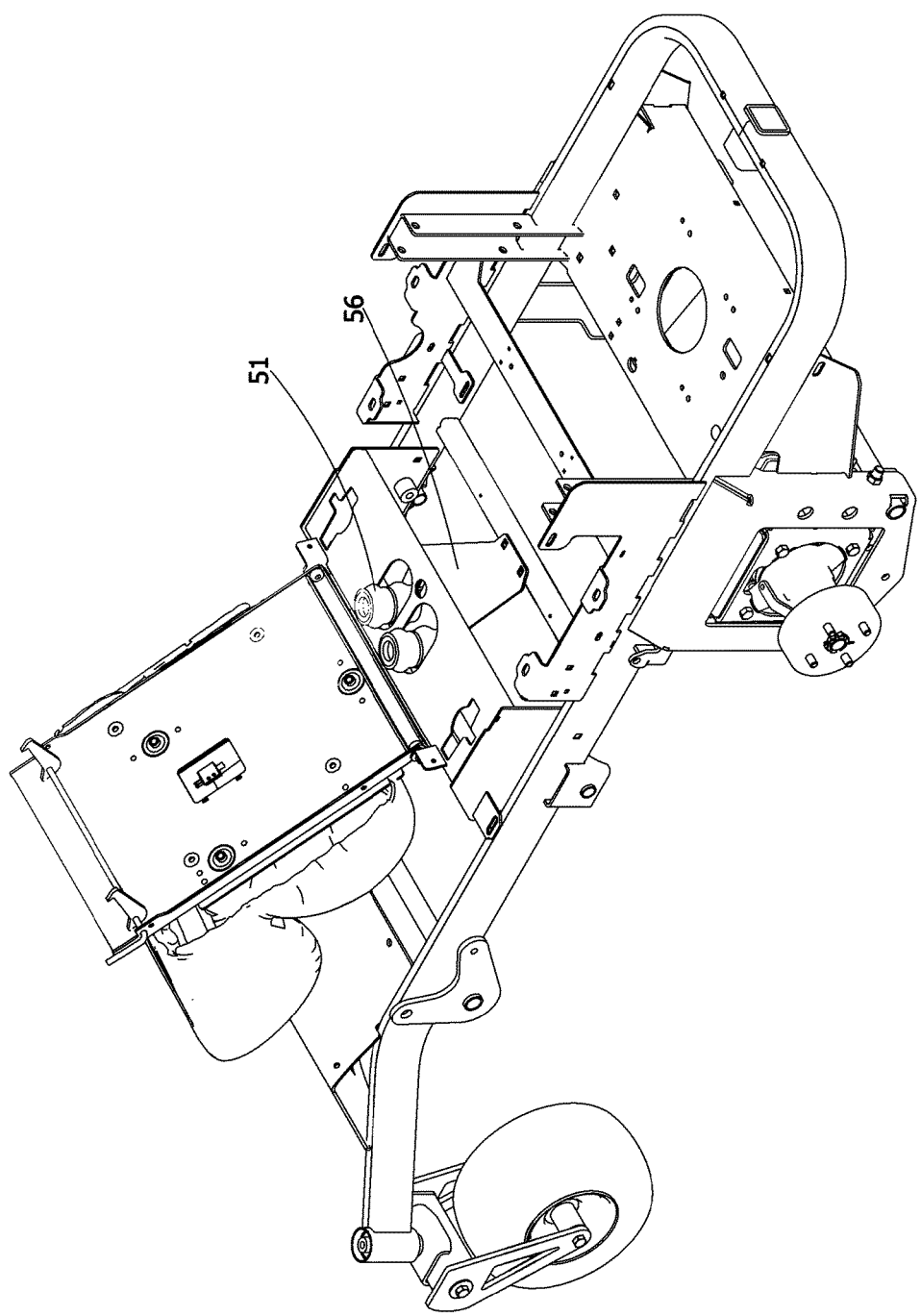
FIG. 21 depicts a perspective view of a representative sample of a seat in a hinged-up position, with shock absorption elements in a fully forward position; also depicted are the aforementioned left motorized wheel suspension system and left non-motorized wheel suspension system.
Figure 22:
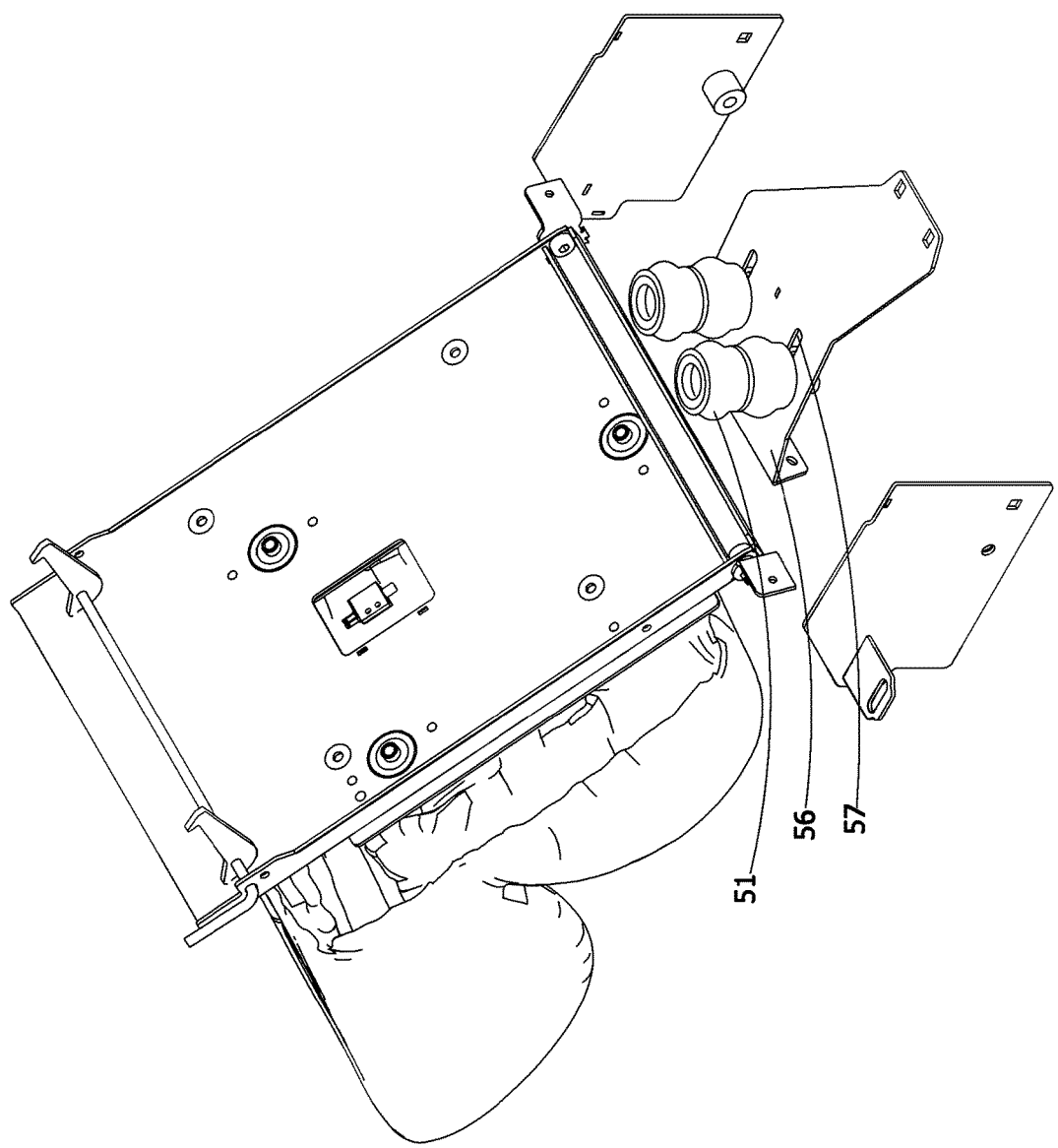
FIG. 22 is another perspective view of the seat with suspension system of FIG. 21, separate from the vehicle, and with a horizontal plate removed to better expose the shock absorption elements.
Figure 23:
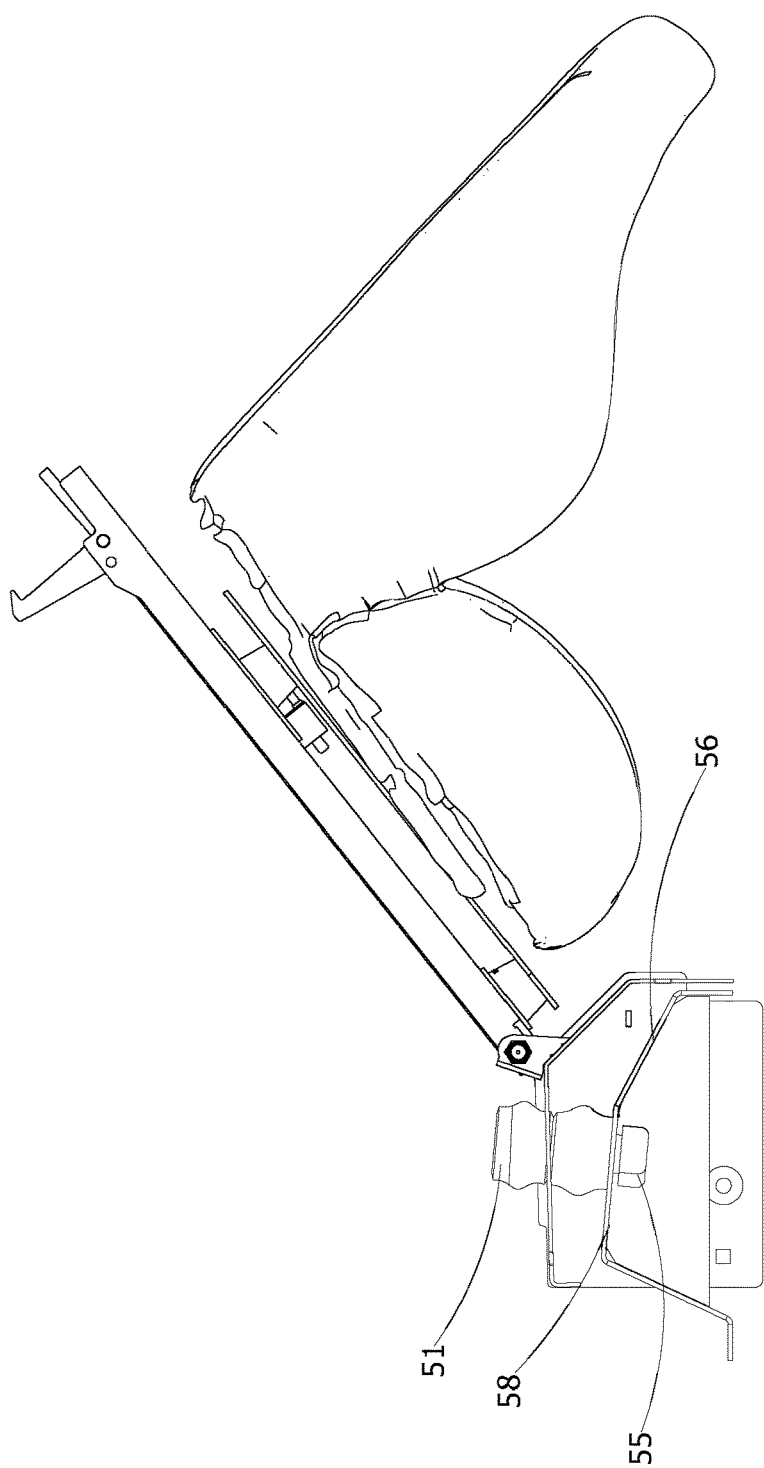
FIG. 23 is a right side elevation view of the seat suspension system of FIG. 21, with a vertical plate removed to better expose the shock absorption element.
Figure 24:
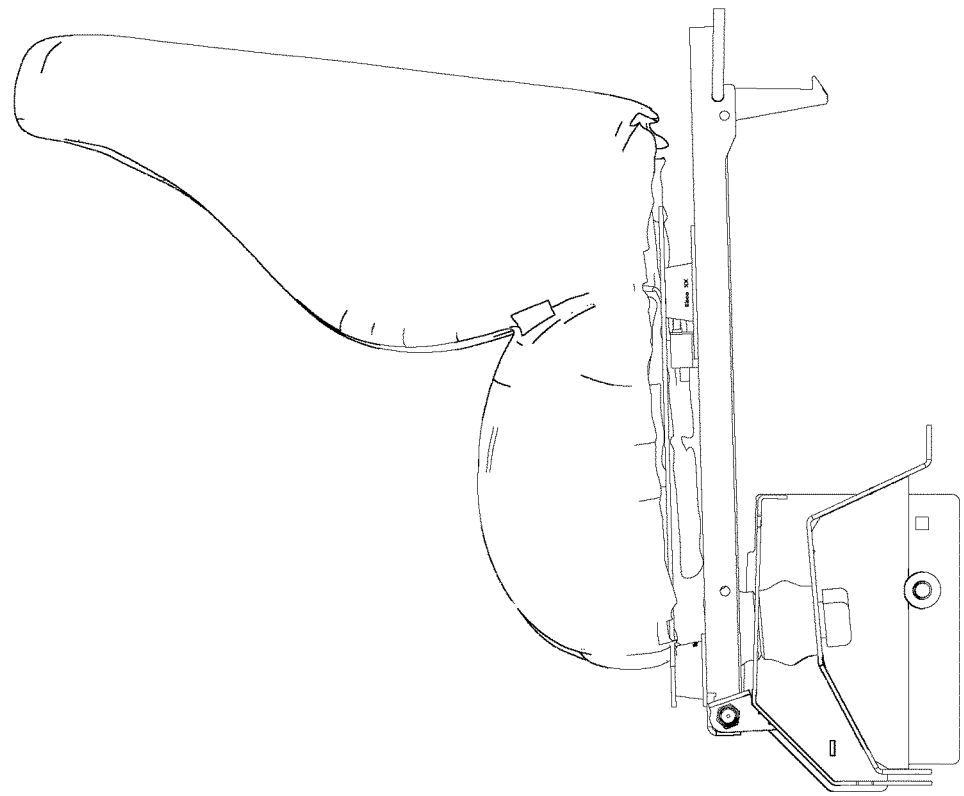
FIG. 24 is a left side elevation view of the seat suspension system of FIG. 21, with the seat in a sitting position.
Figure 25:
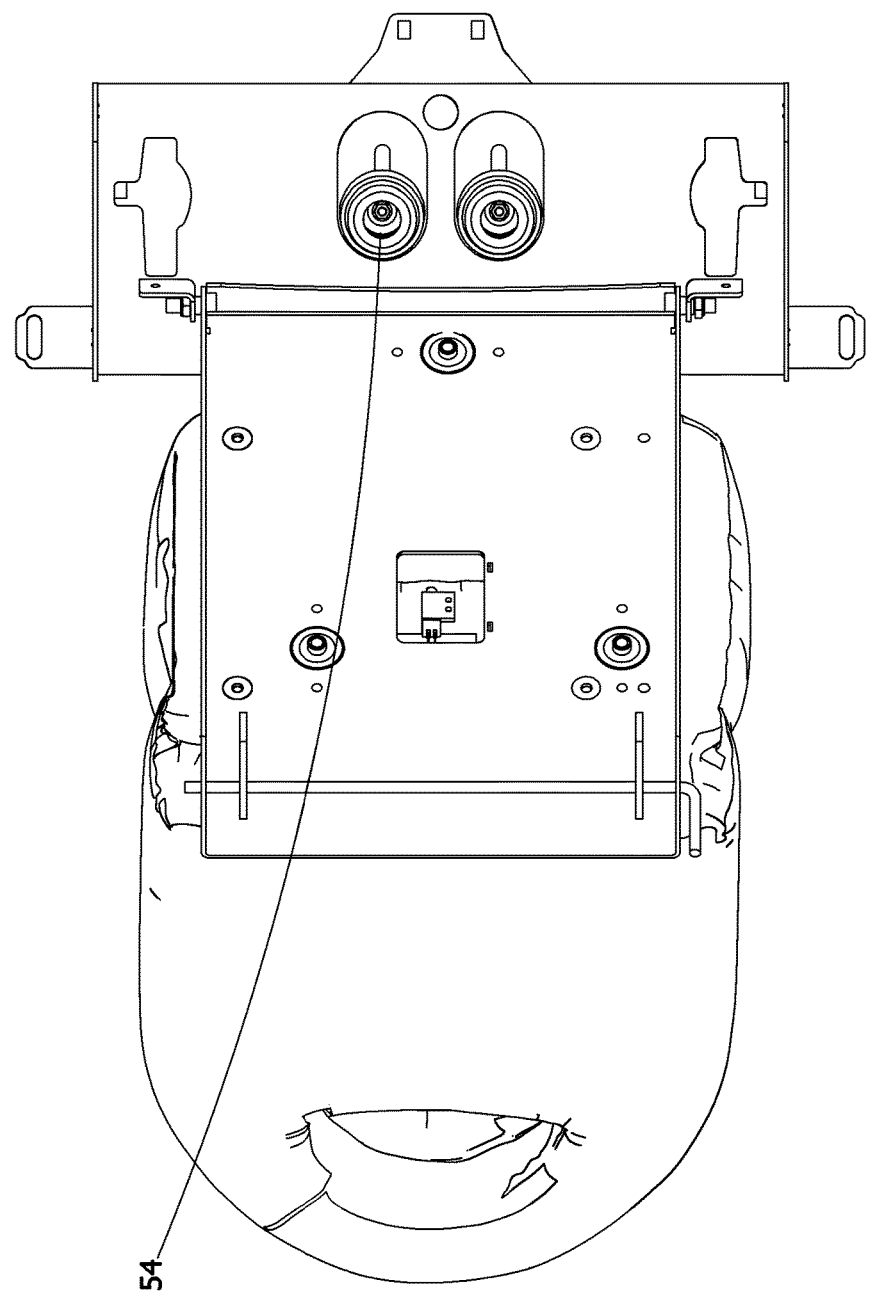
FIG. 25 is a top plan view of the seat suspension system of FIG. 21.
Figure 26:
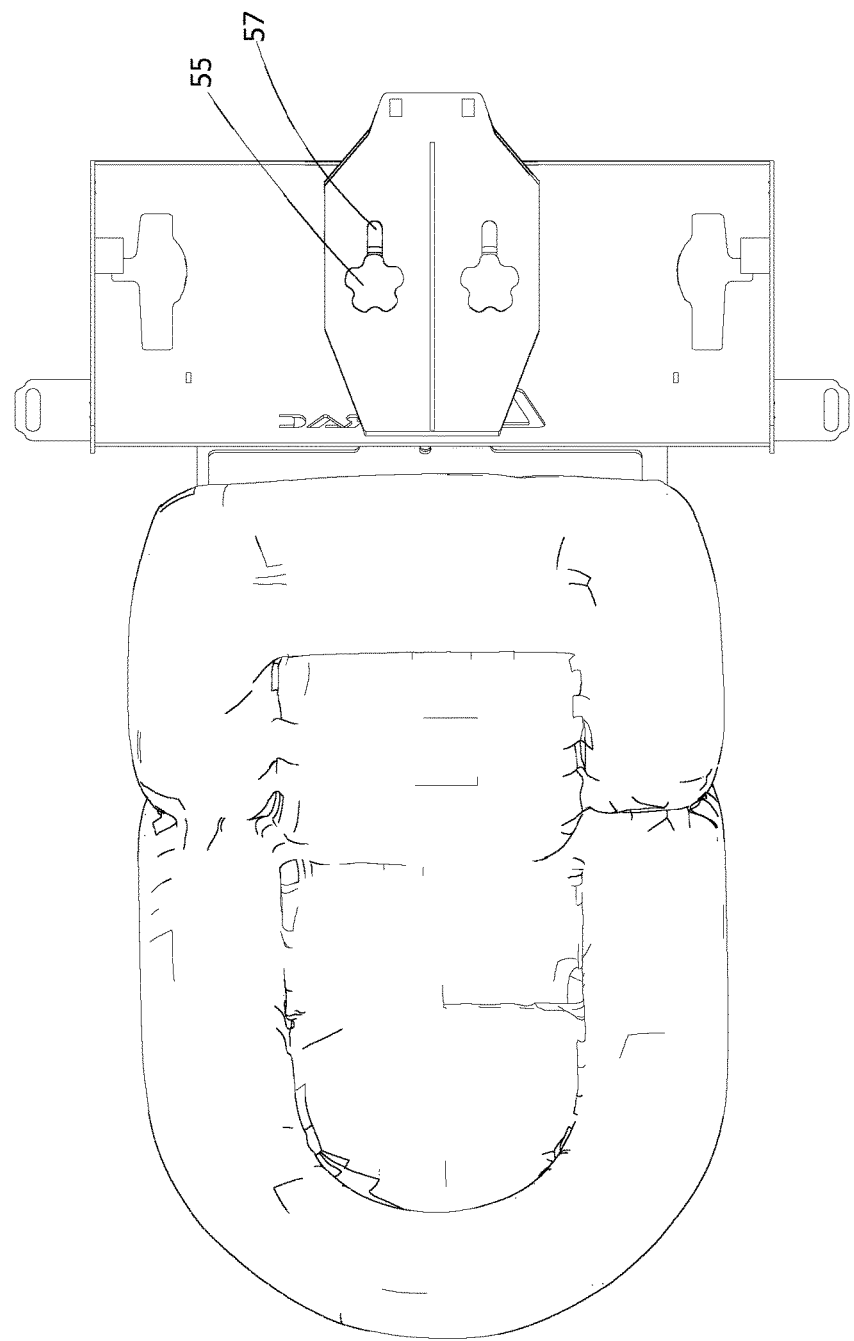
FIG. 26 is a bottom plan view of the seat suspension system of FIG. 21.
Figure 27:
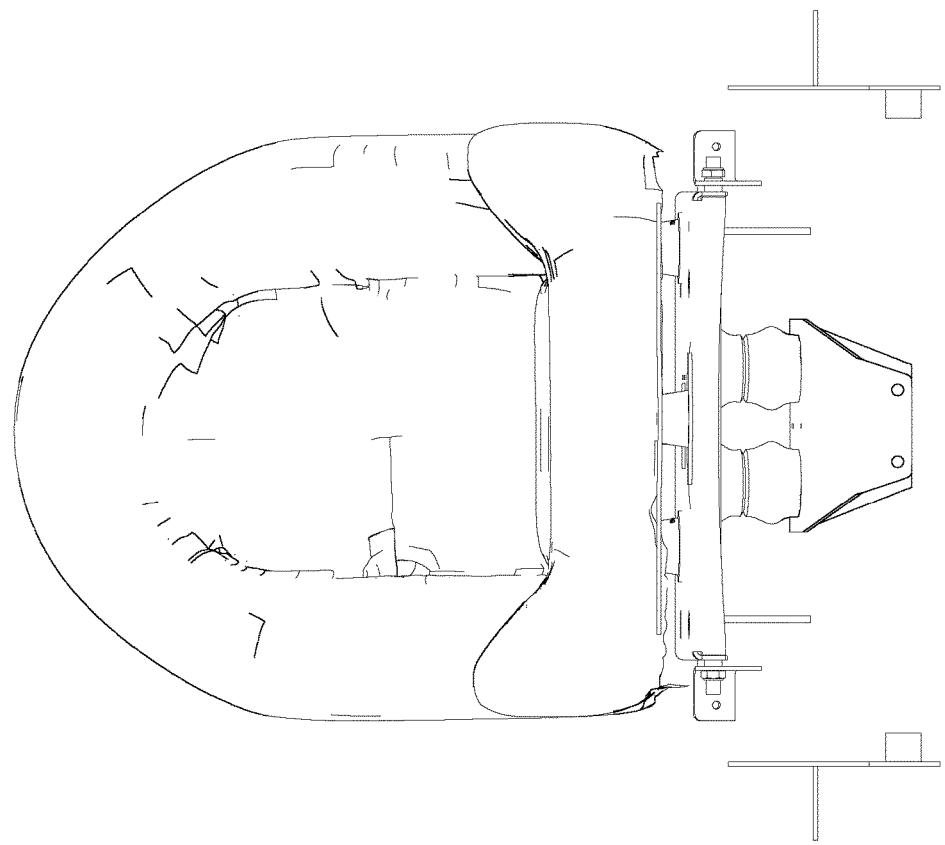
FIG. 27 is a front elevation of the seat suspension system of FIG. 21, with the seat in a sitting position and with a horizontal plate removed to better expose the shock absorption elements.
Figure 28:
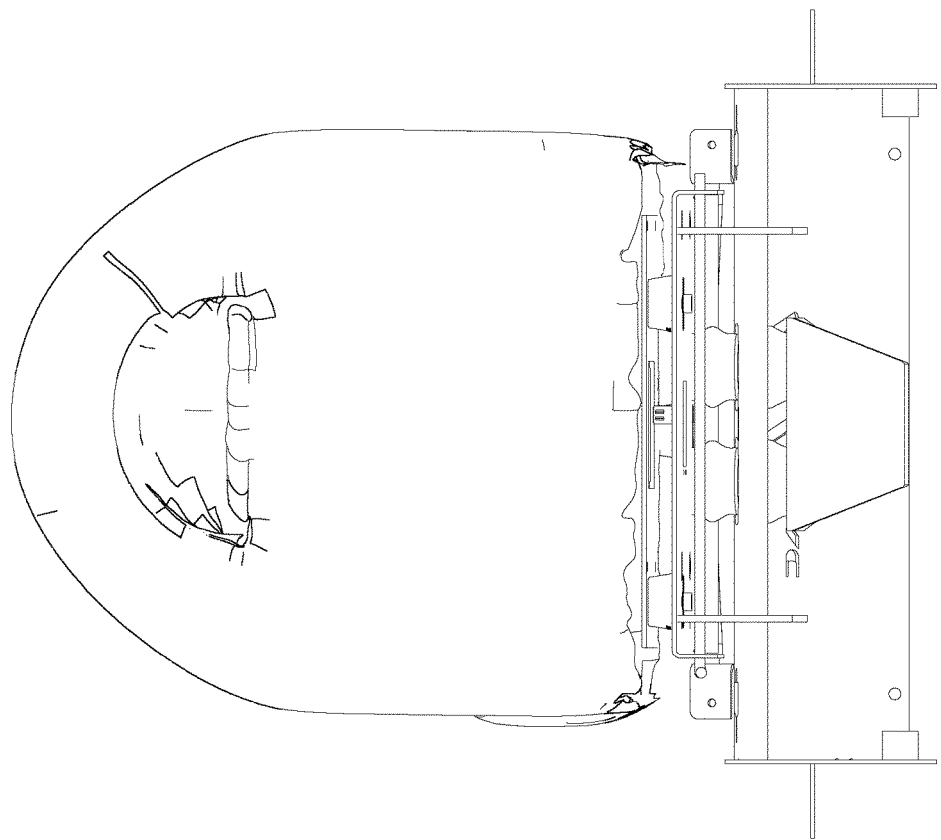
FIG. 28 is a rear elevation of the seat suspension system of FIG. 21, with the seat in a sitting position.
Figure 29:
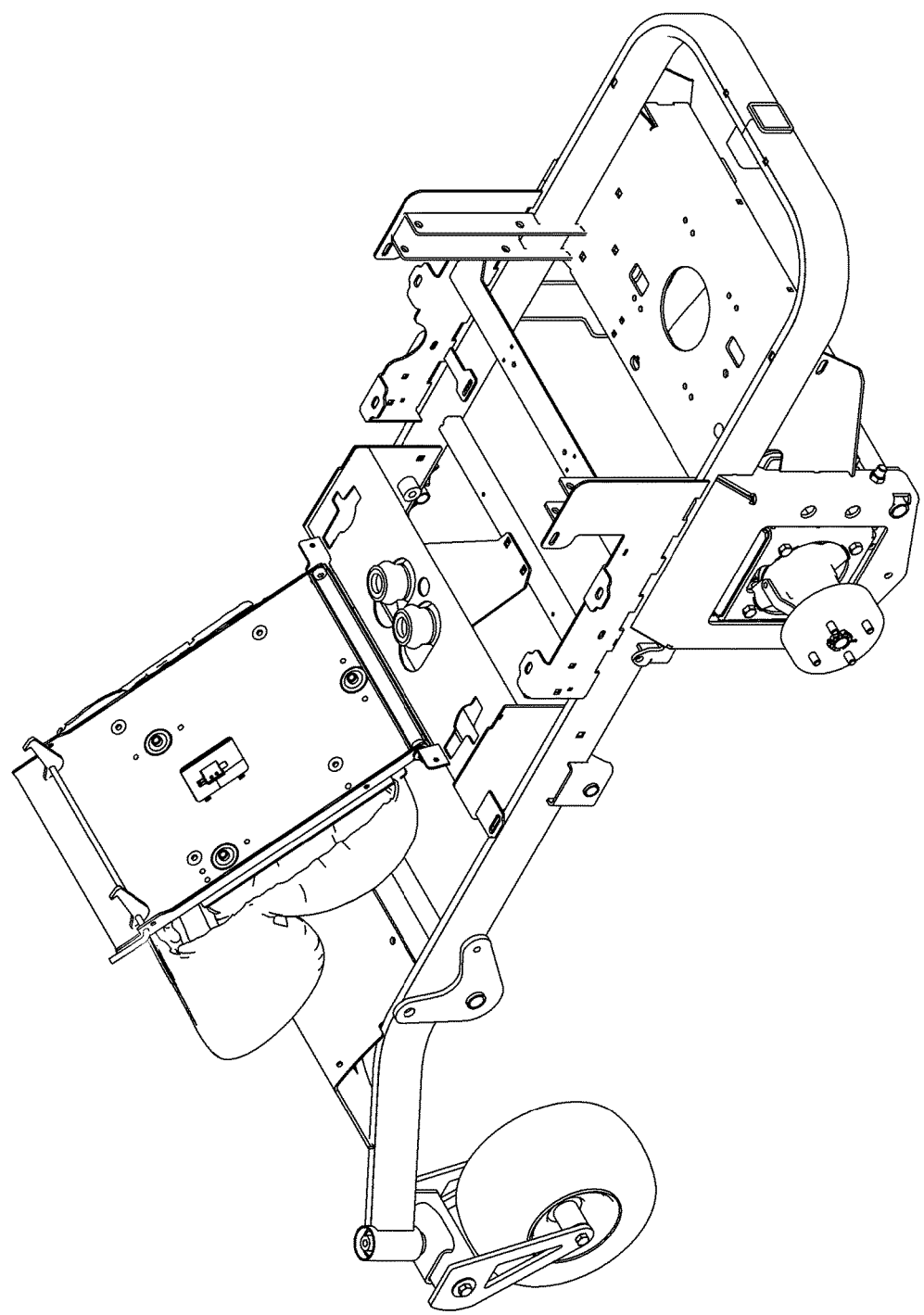
FIG. 29 is a perspective view of the seat with suspension system of FIG. 21, with the shock absorption elements in a fully rearward position.
Figure 30:
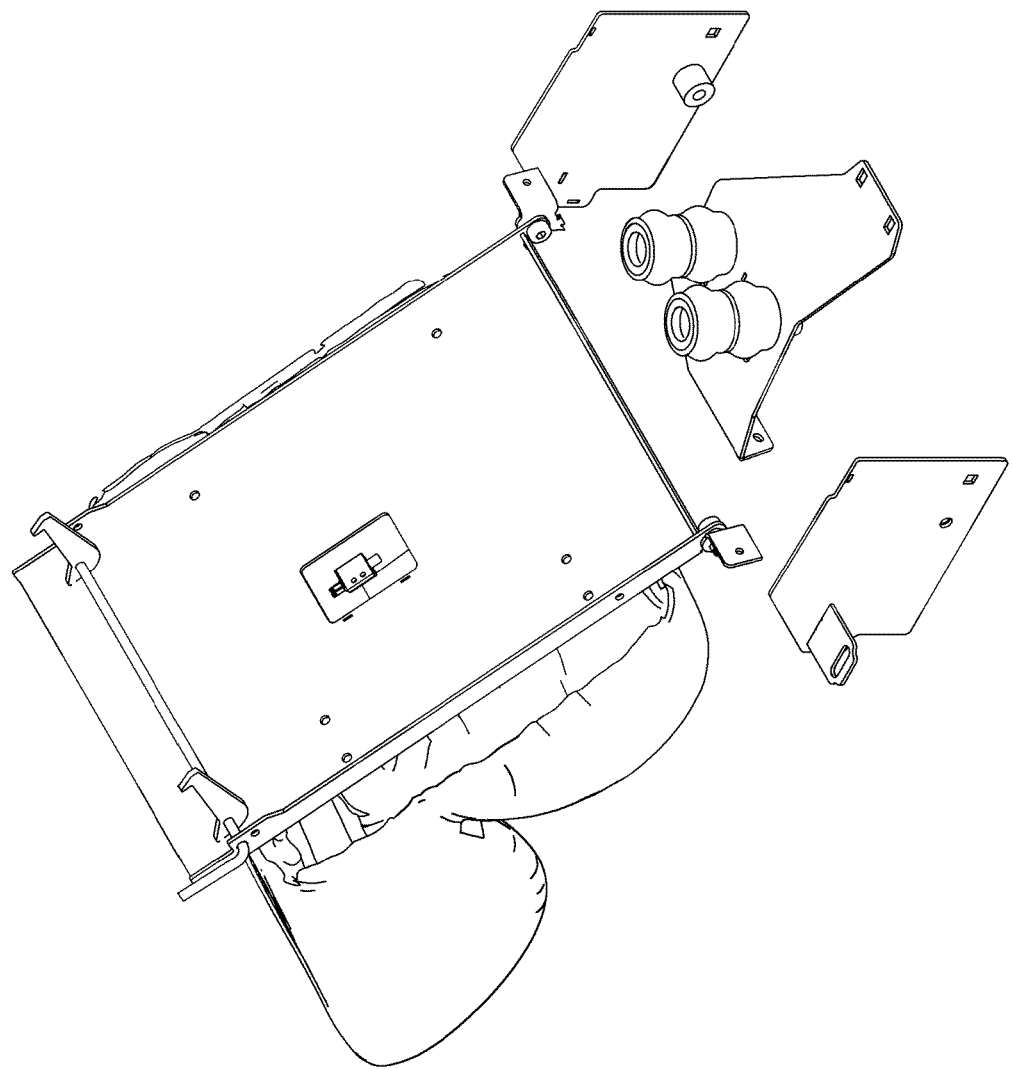
FIG. 30 is another perspective view of the seat with suspension of FIG. 29, separate from the vehicle, and with a horizontal plate removed to better expose the shock absorption elements.
Figure 31:
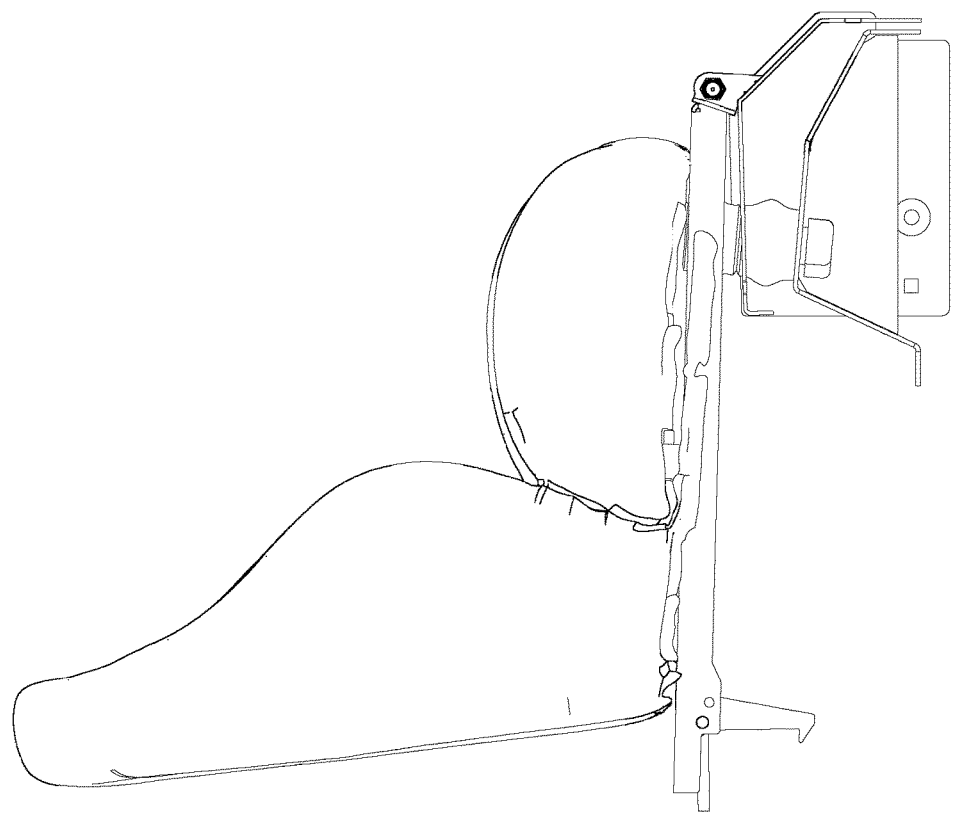
FIG. 31 is a right side elevation view of the seat suspension system of FIG. 29 with the seat in a sitting position, and with a vertical plate removed to better expose the shock absorption element.
Figure 32:
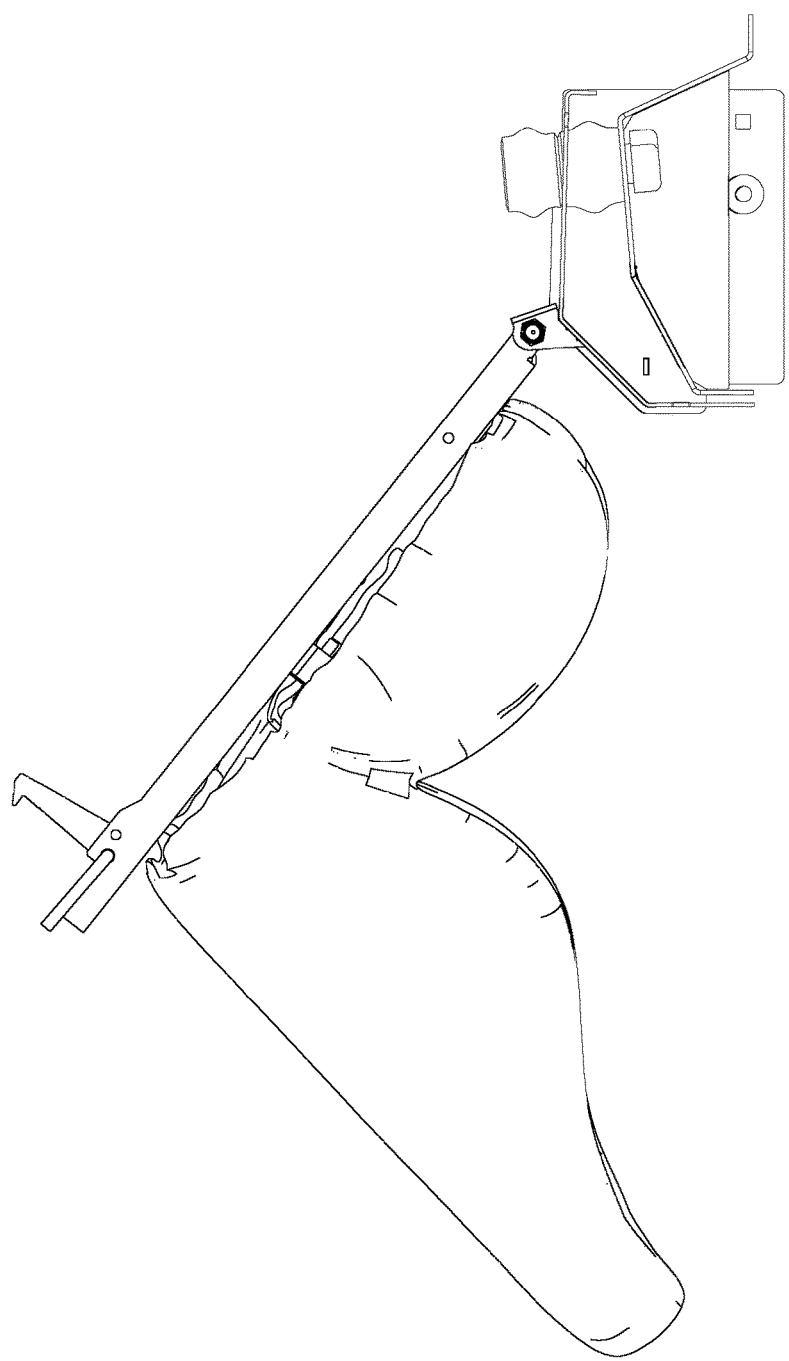
FIG. 32 is a left side elevation view of the seat suspension system of FIG. 29, with a vertical plate removed to better expose the shock absorption element.
Figure 33:
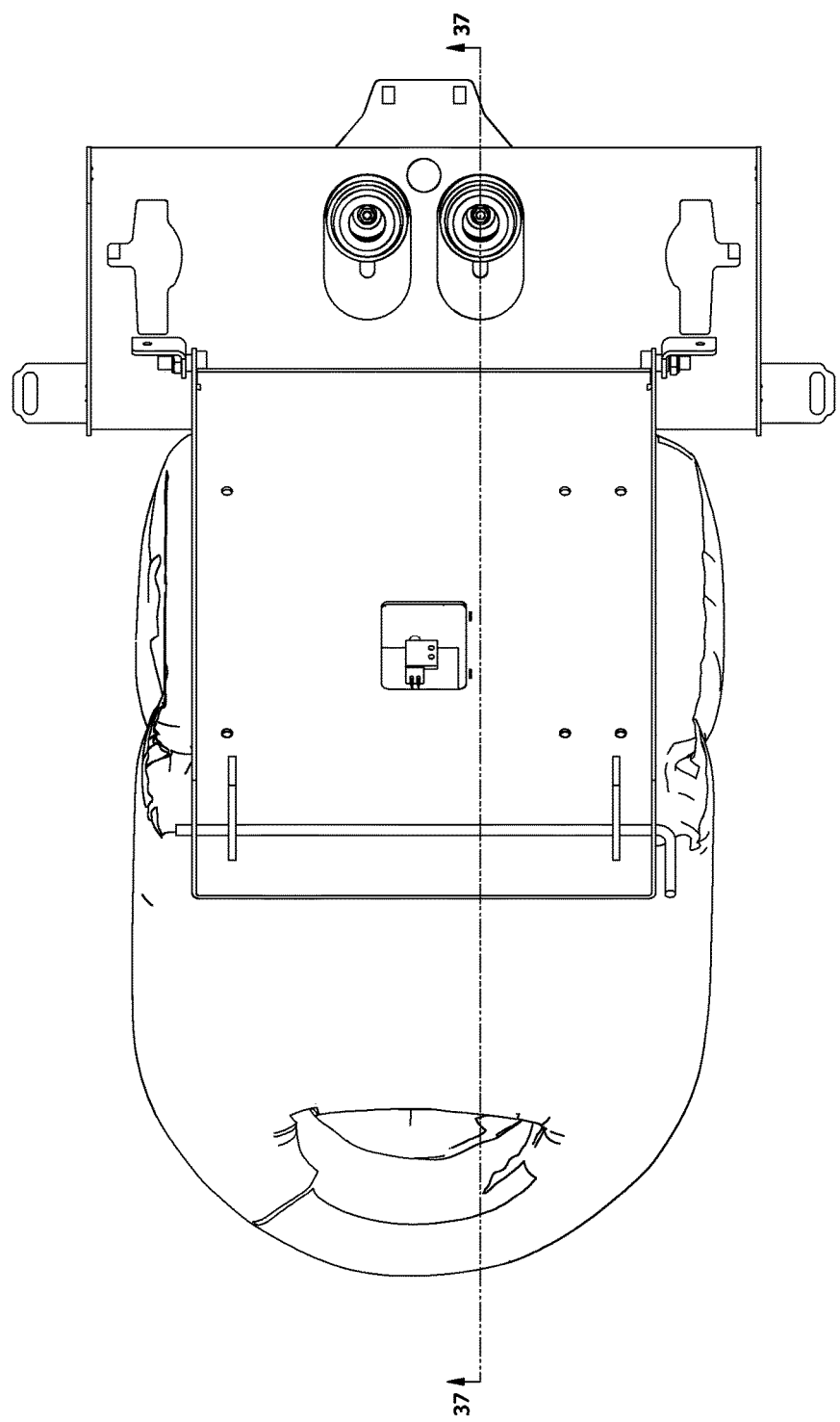
FIG. 33 is a top plan view of the seat suspension system of FIG. 29.
Figure 34:
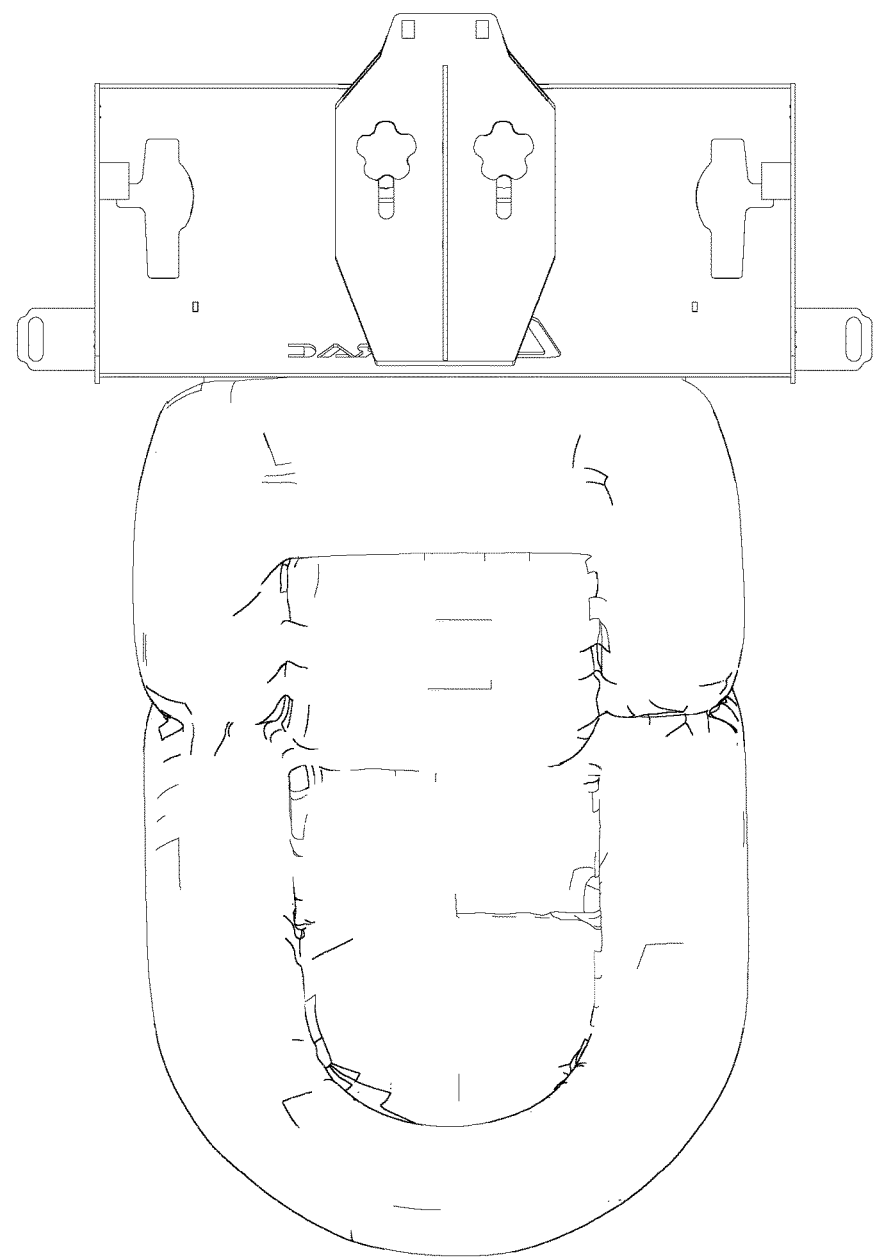
FIG. 34 is a bottom plan view of the seat suspension system of FIG. 29.
Figure 35:
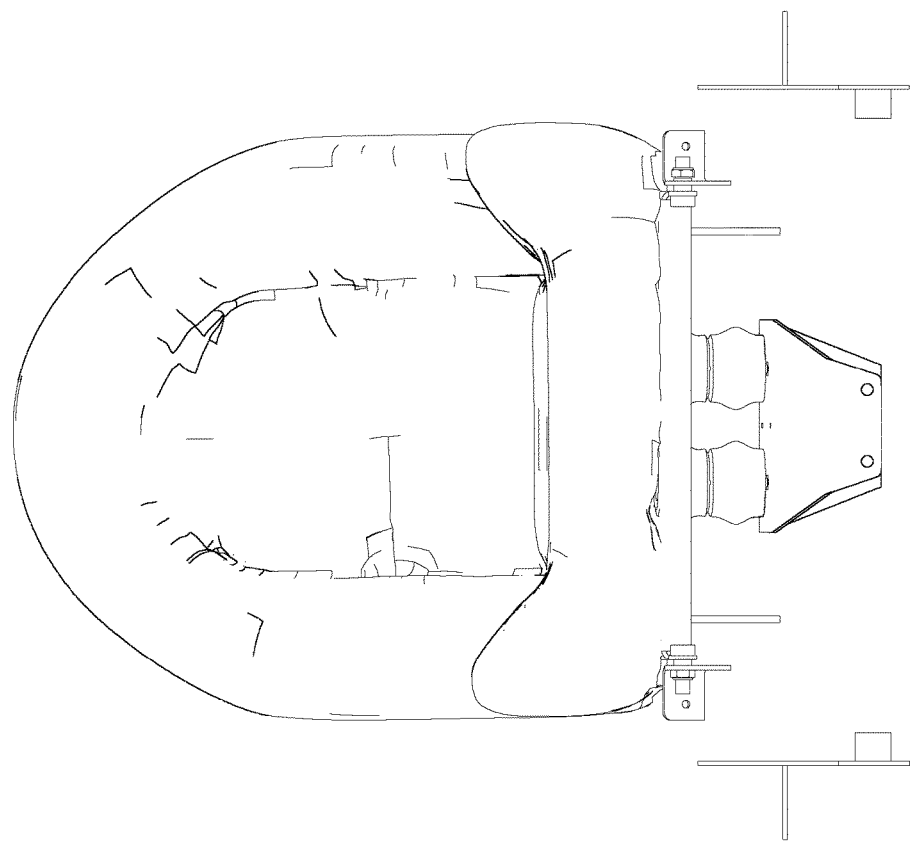
FIG. 35 is a front elevation of the seat suspension system of FIG. 29, with the seat in a sitting position and with a horizontal plate removed to better expose the shock absorption elements.
Figure 36:
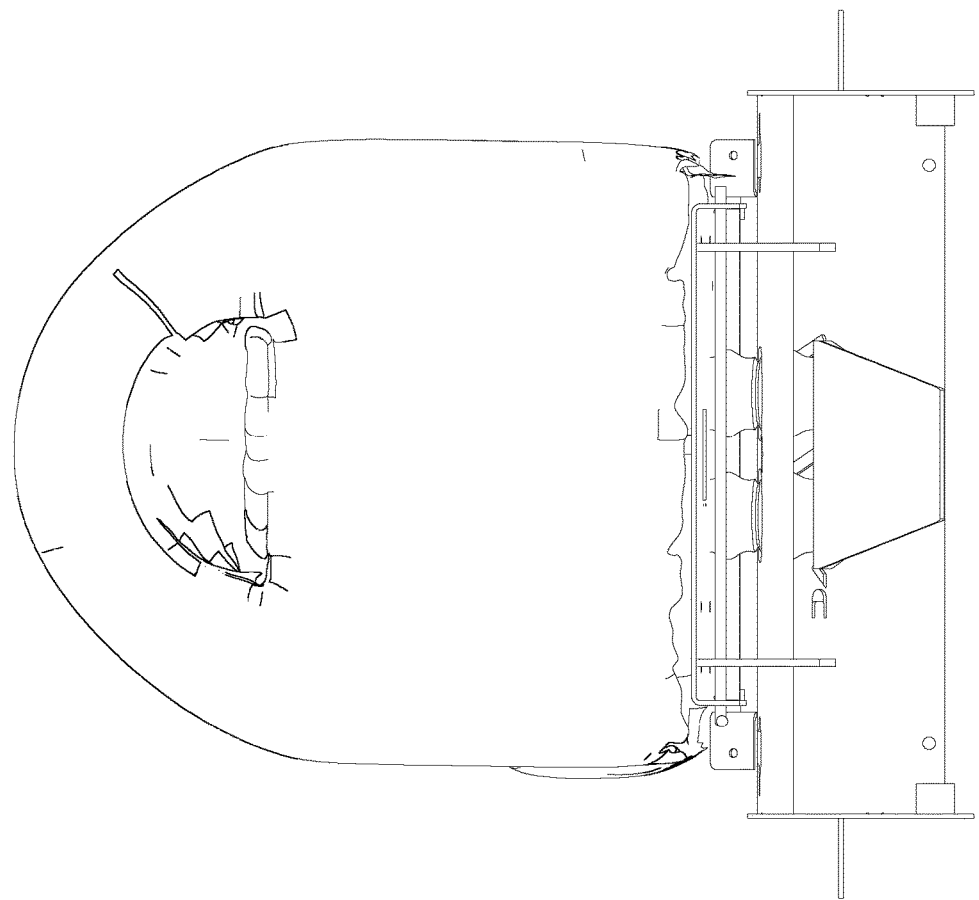
FIG. 36 is a rear elevation view of the seat suspension system of FIG. 29, with the seat in a sitting position.
Figure 37:
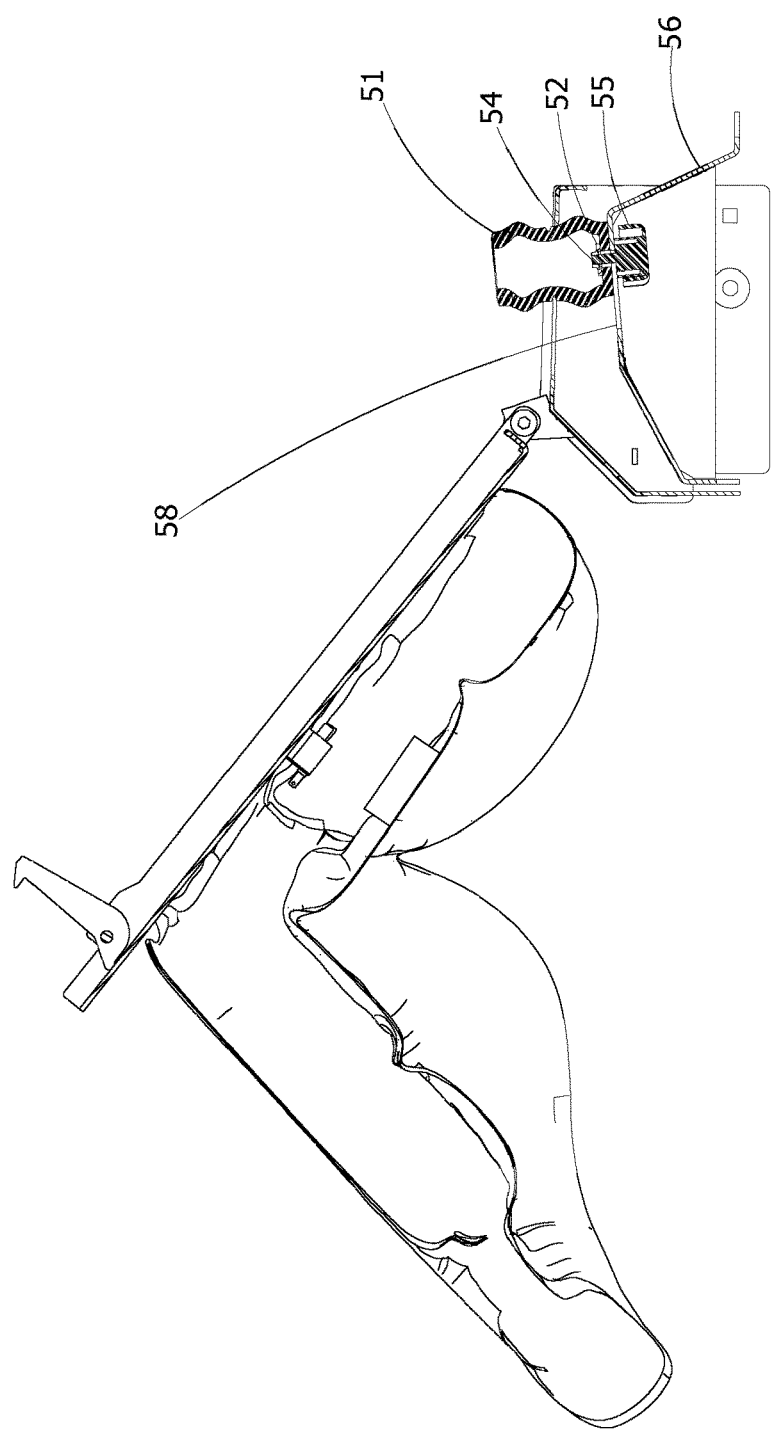
FIG. 37 depicts a cross section view of the seat suspension system of FIG. 29, at plane 37-37 of FIG. 33.
Figure 38:
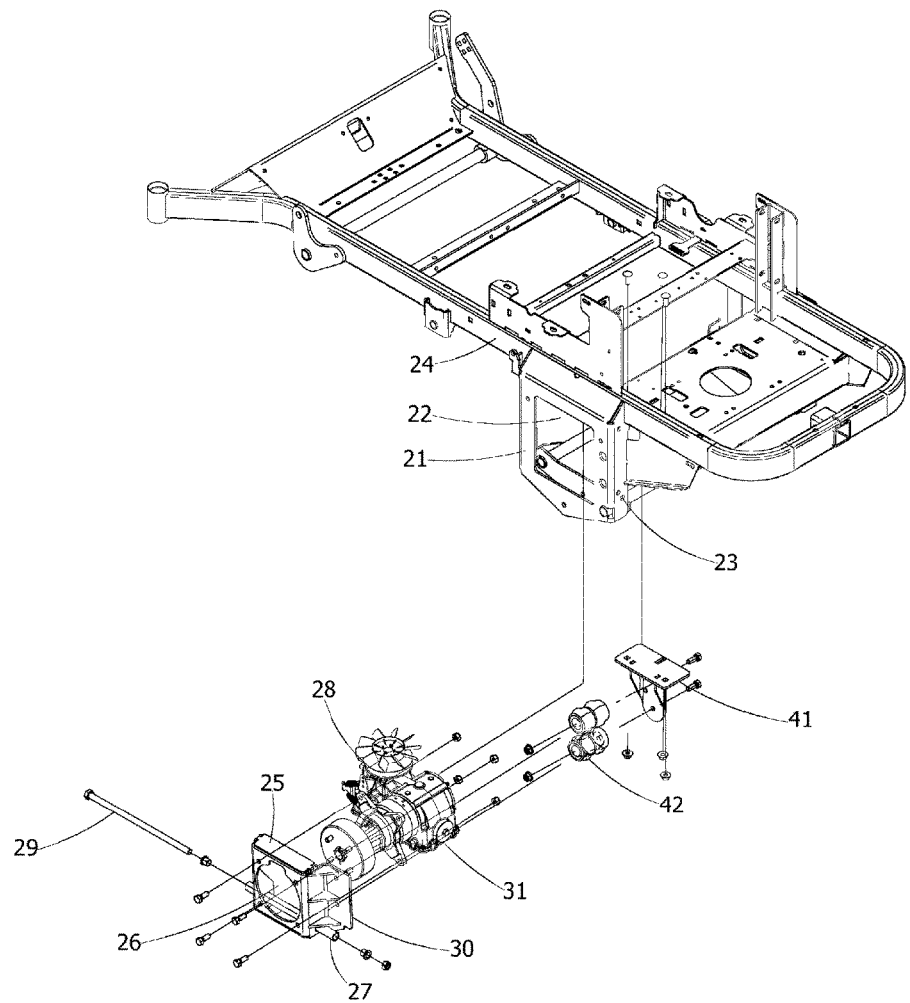
FIG. 38 depicts a perspective view of a representative sample of another embodiment of the left suspension system in exploded view, showing an elastomeric structure (42).

The front wheel (or non-drive wheel) assembly is broken down into its various components in FIG. 14. Each front wheel assembly includes a wheel with an axle (10) supported by axle struts (11) or forks. The upper ends of the forks attach firmly to the opposite ends of the sleeve assembly. In the case of a caster, the sleeve (12) is anchored to a vertical post (13) which is mounted in a bearing housing (14) of the chassis. This assembly permits the wheel to rotate freely about the post.

Unlike prior art wherein a shock absorption spring, cylinder or elastomeric "pillow" dampens vertical displacement of the wheels, the elastomeric insert (14) of the present invention is positioned to interact with the front wheel in a manner that dampens displacement of the wheel in diagonal directions as well.

In general, the free-wheel suspension disclosed herein comprises (includes) a suspension system absorbing shock to a wheel assembly carried on a chassis frame having a longitudinal left or right side-rail supporting each respective wheel assembly. The suspension system includes a sleeve (12) housing an elastomeric insert (14) defining a non-round passageway (15) or bore therethrough. A non-round core structural element (16) is snugly received within said bore, and includes opposing non-round ends (17) protruding from said sleeve. The suspension system further includes a pair of downstanding struts (11) forming the "forks" for a wheel axle. Each strut has a lower end fastened to the axle-hub of the wheel rotatable thereon. Each of said struts also has an upper end having an aperture (18) sized to snugly receive and anchor a respective non-round end of said core protruding from said sleeve. Typically there is a threaded bore in each end of the core, accepting a bolt or similar connector to firmly join the strut to the sleeve assembly (sleeve plus elastomeric insert plus structural core).

In one preferred embodiment, the elastomeric insert is bisected, so that it includes an opposing pair of insert-lets having an aggregate length of almost that of said insert. Ideally each of said insert-lets has an upraised stop on the outer end, preventing complete insertion into said sleeve. Typically that stop is an outstanding flange or edge. That may also function as a spacer, sandwiched between the edge of the sleeve and the inner face of the strut.

The wheel assembly may be a caster, typically rotatable around a post; the sleeve may be supported beneath the rotary post of the caster.

One specific embodiment includes a suspension system absorbing shock to a wheel assembly, wherein:

(a) the sleeve comprises tubular steel having a square or rectangular cross-section;

(b) the elastomeric insert comprises an opposing pair of insert-lets, each having an upraised stop edge on an outer end and having a correspondingly square or rectangular cross-section slightly smaller than that of said sleeve, said insert-lets constructed of neoprene, and defining a non-round bore; and (c) the non-round core comprises steel having a square or rectangular cross-section slightly smaller than that of the bore.

It is a further feature of the present invention that a drive wheel suspension system is provided with vibration damping capability. Moreover, the elastomeric bumper of the disclosed drive wheel suspension system is positioned to interact with a drive wheel in a manner that absorbs upward displacement of the wheel while reducing the risk decoupling any belt coupling the drive wheel motor to another motive element of the vehicle. An alternative embodiment to this system includes substituting at least one compression spring or similarly functioning structure for each elastomeric bumper. Each spring may be anchored at its interior end in a manner similar to the replaced bumper or, preferably, the spring may remain unanchored, each end of the spring essentially being impaled upon a separate guide structure; one outer guide may be anchored to the stop plate or similar structure on or near the cradle-frame while one inner guide may be anchored to a bracket downstanding from an intermediate portion of a chassis support structure. This suspension system may also be used in non-motor-driven wheel assemblies in which the wheel has a pivot-mounting similar to that of a drive wheel (but without the motor).

Each elastomeric insert or bumper is resilient and may be of any one of several durometers of rubber hardness, or may be of other suitable elastomeric materials, including shells enclosing a liquid or other compressible material. The bumper(s) indirectly cushion the wheel from upward displacement, by hindering sudden upward displacement that causes pivoting of the interior cradle-frame (carrying the motorized wheel) against the elastomeric bumper mounted horizontally beneath the chassis and interior to the pivot point. Further, each wheel functions independently, i.e., independent of the frame, in order that it may respond independently to variations in the terrain met by each individual wheel, which may be several feet removed from its companion wheel.

Each compression spring or similarly functioning structure should have sufficient resistance to compression to appropriately dampen the force created by the vehicle's wheel traversing a bump.

Figure 2:
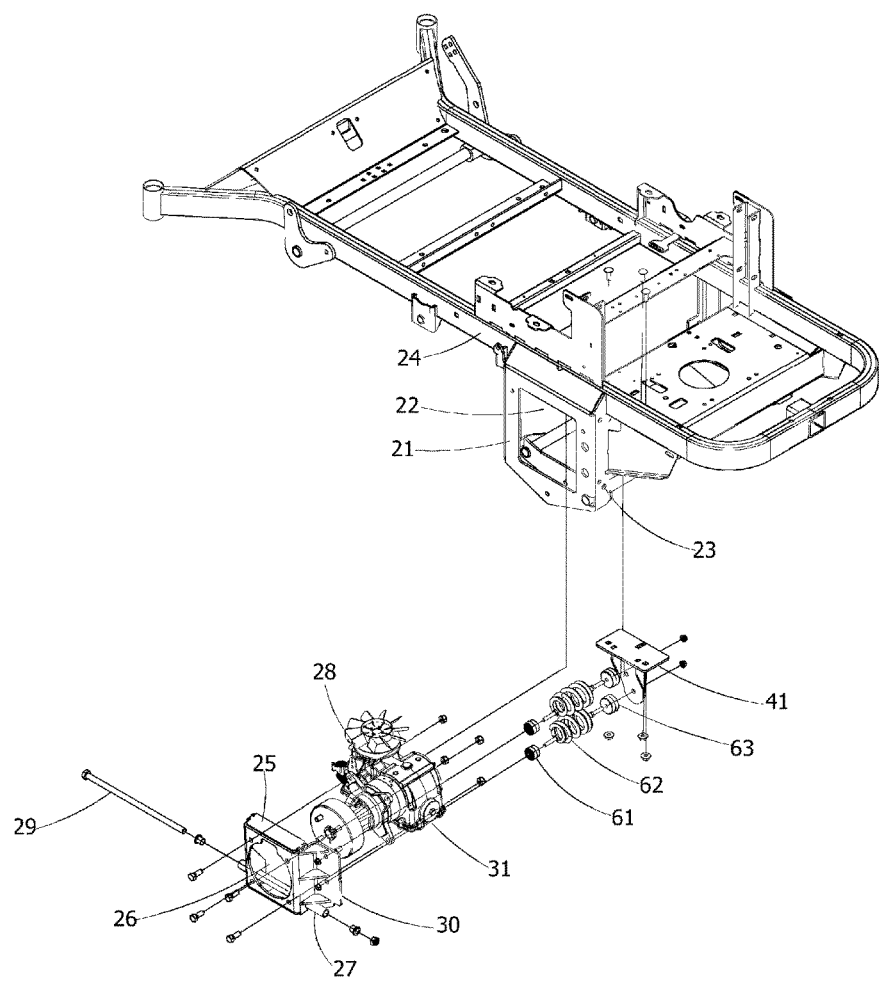
FIG. 2 depicts the view of FIG. 1, with the left suspension system in exploded view.
Figure 3:
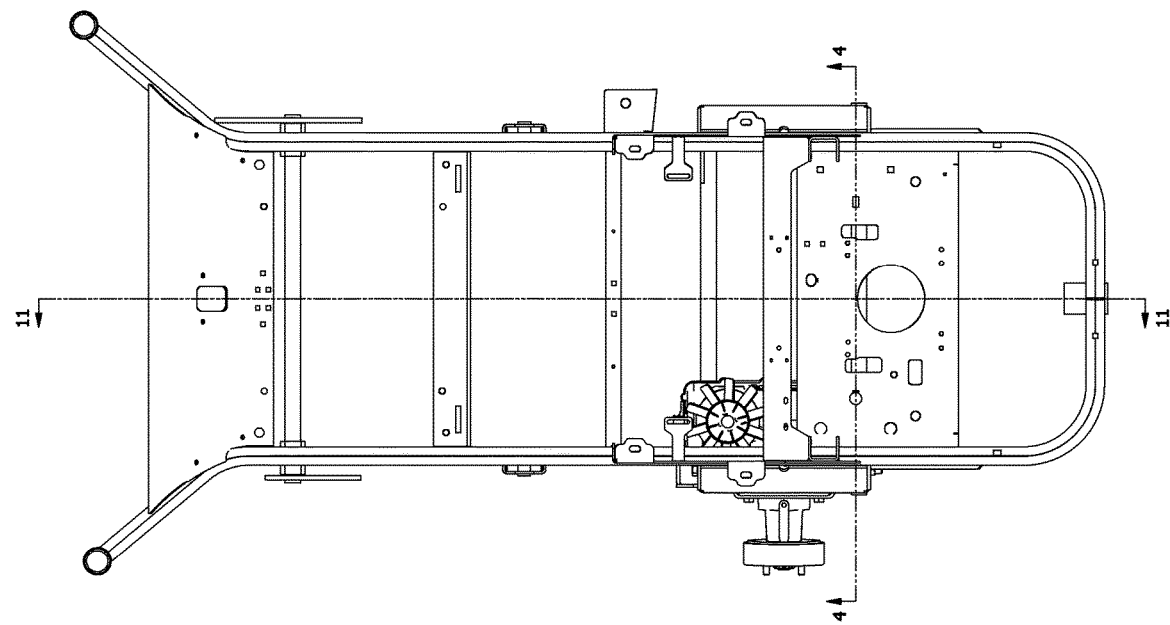
FIG. 3 depicts a top plan view of the drive wheel suspension system of FIG. 2, assembled.
Figure 4:
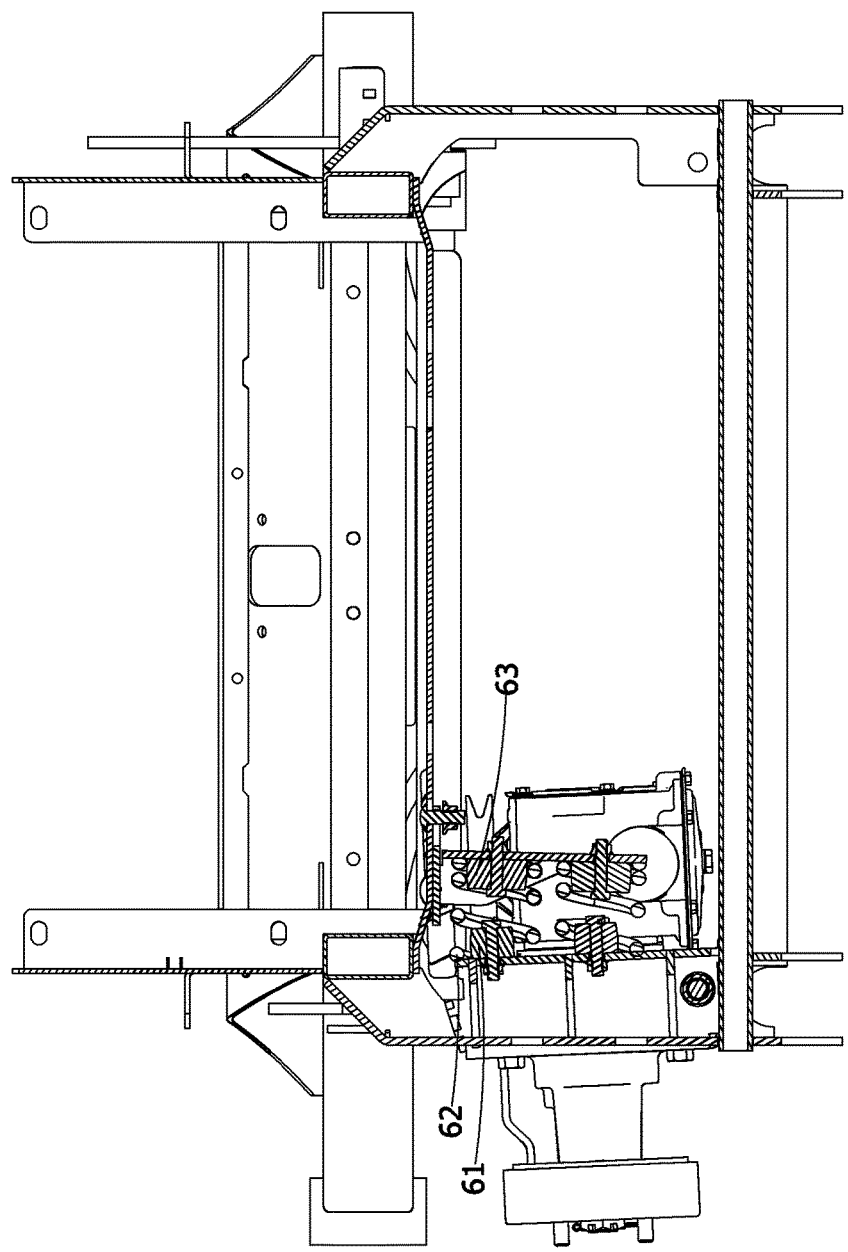
FIG. 4 depicts a rear cross section view of the drive wheel suspension system of FIG. 3, at plane 4-4 of FIG. 3.
Figure 5:
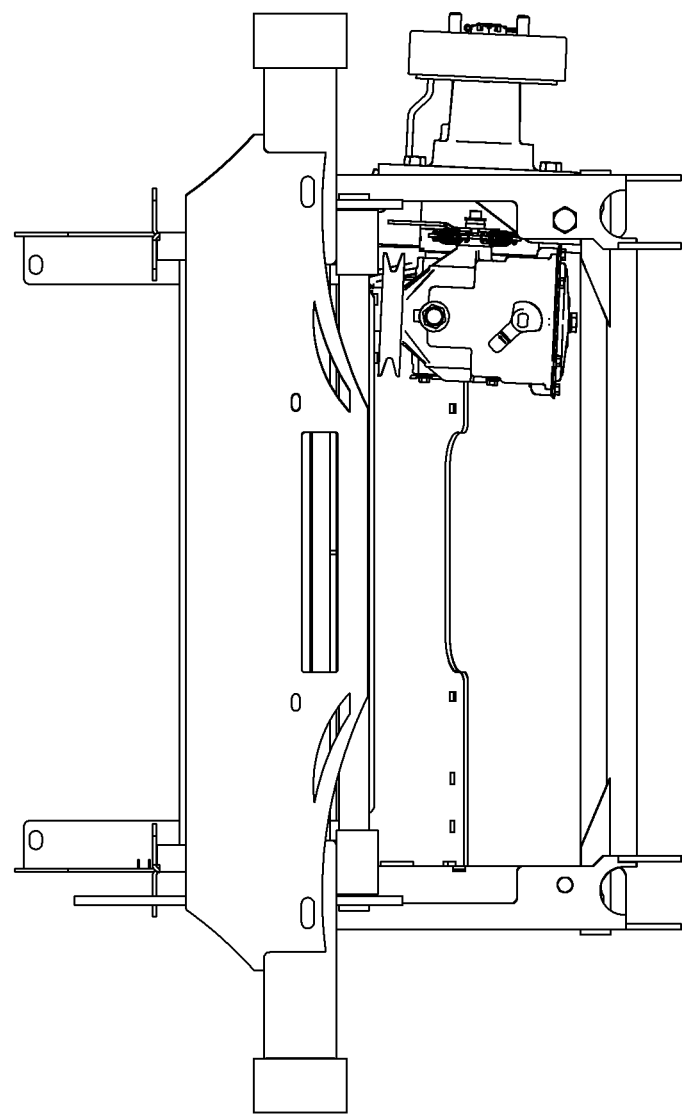
FIG. 5 depicts a front elevation view of the drive wheel suspension system of FIG. 3.
Figure 6:
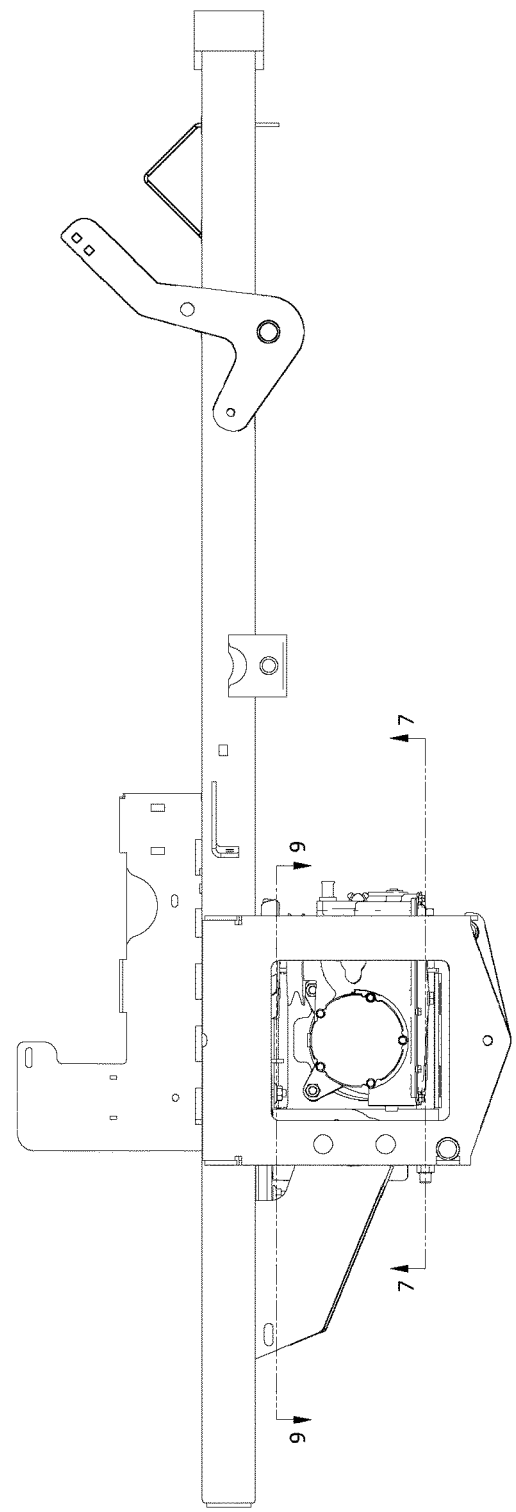
FIG. 6 depicts a left side elevation view of the drive wheel suspension system of FIG. 3.
Figure 7:
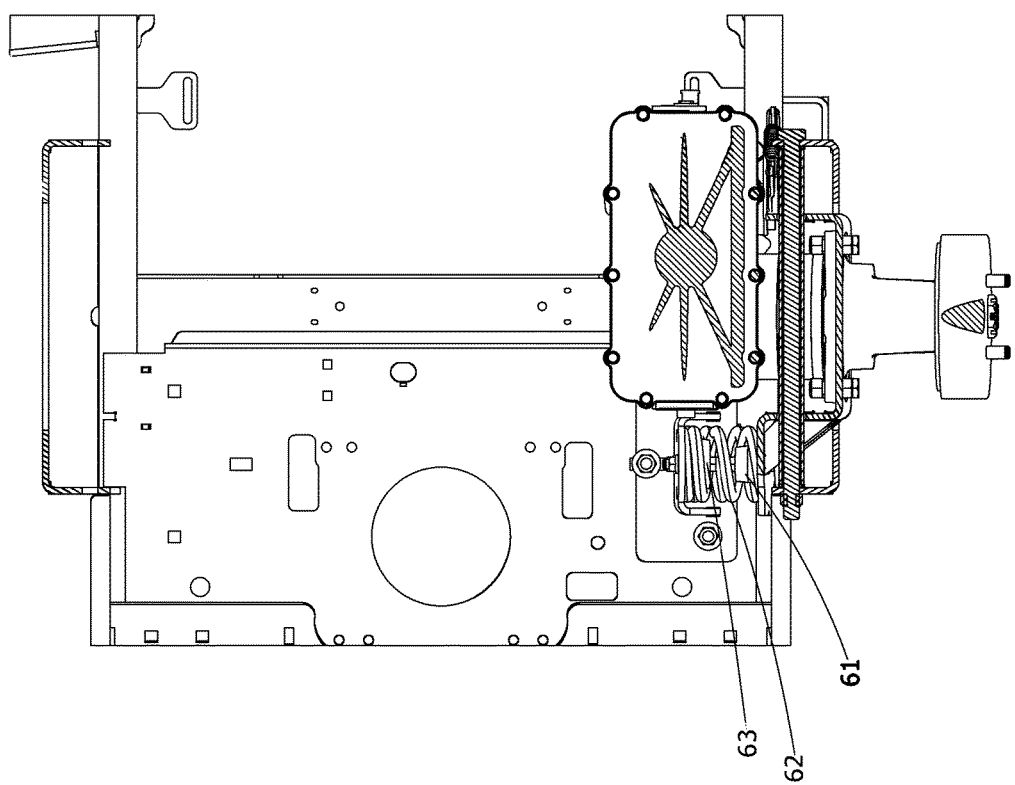
FIG. 7 depicts a cross section view of the drive wheel suspension system of FIG. 3, at plane 7-7 of FIG. 6.
Figure 8:
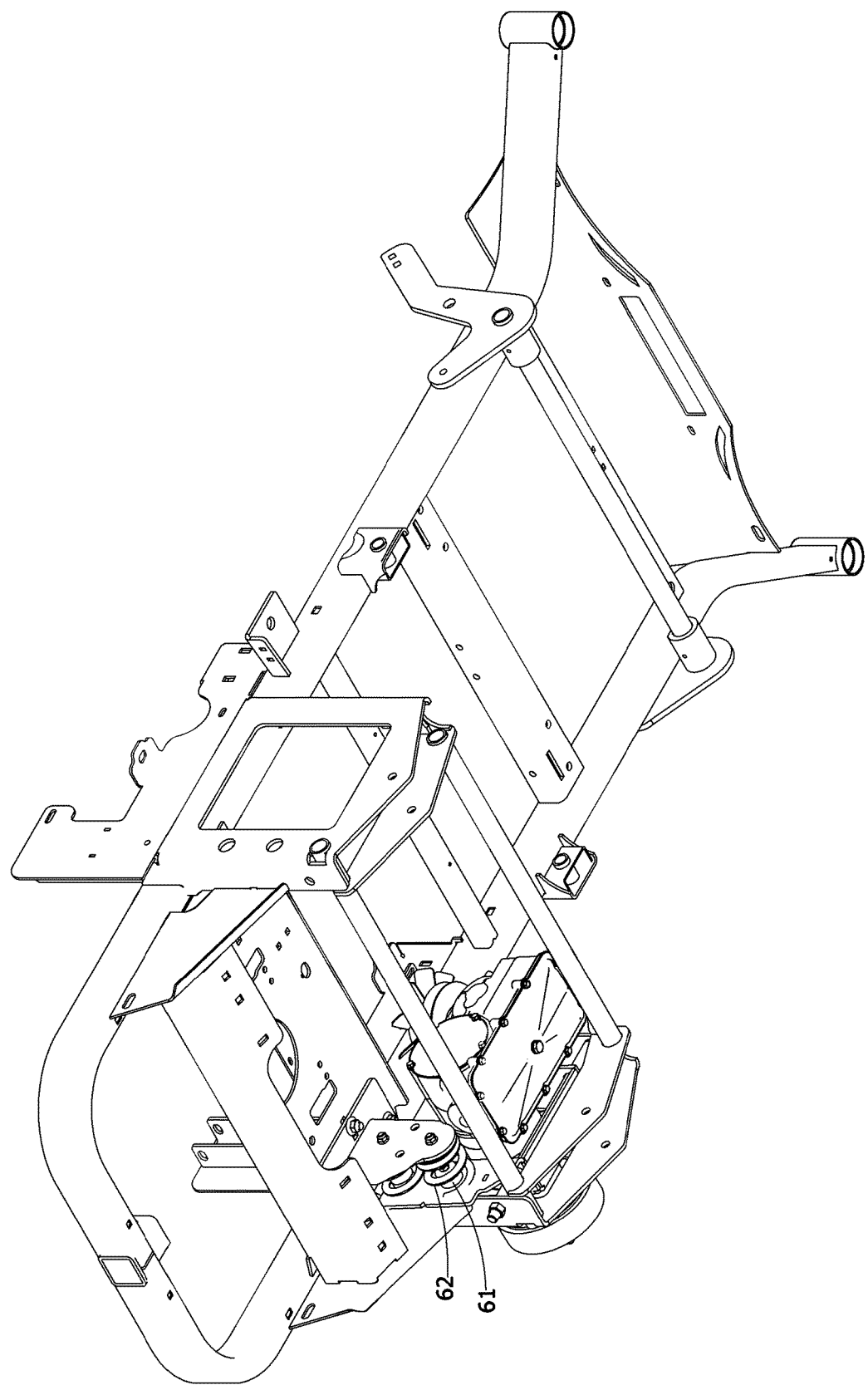
FIG. 8 depicts a rear perspective view from underneath the drive wheel suspension system of FIG. 3.
Figure 9:
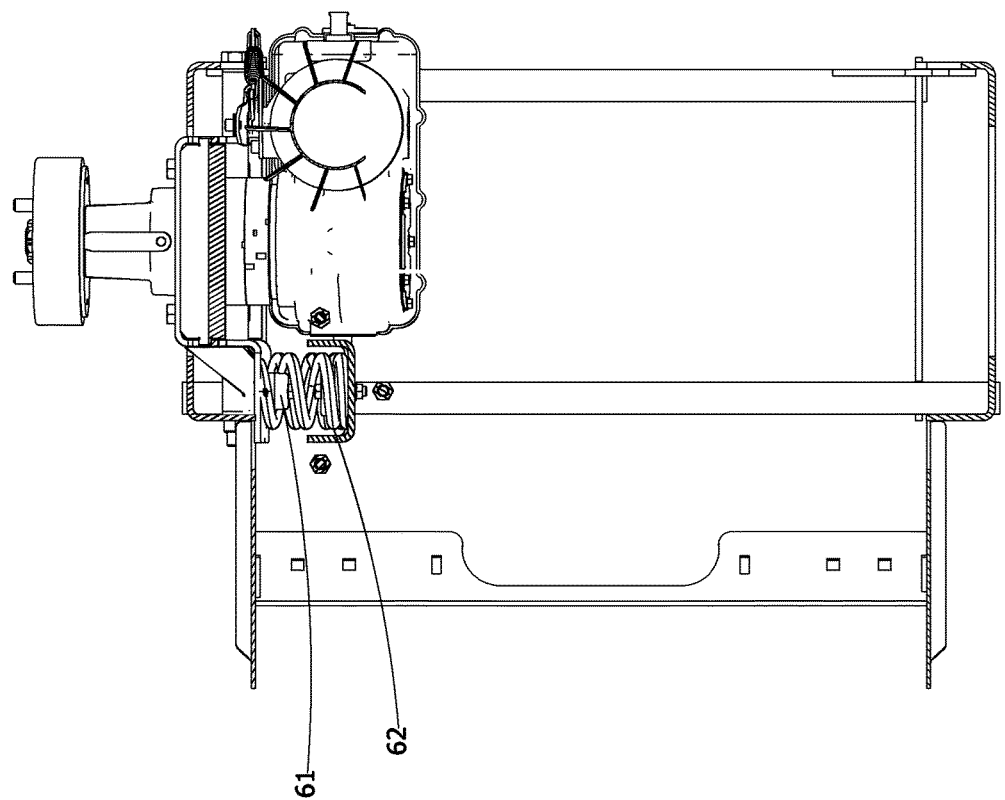
FIG. 9 depicts a cross section view of the drive wheel suspension system of FIG. 3, at plane 9-7 of FIG. 8.
Figure 10:
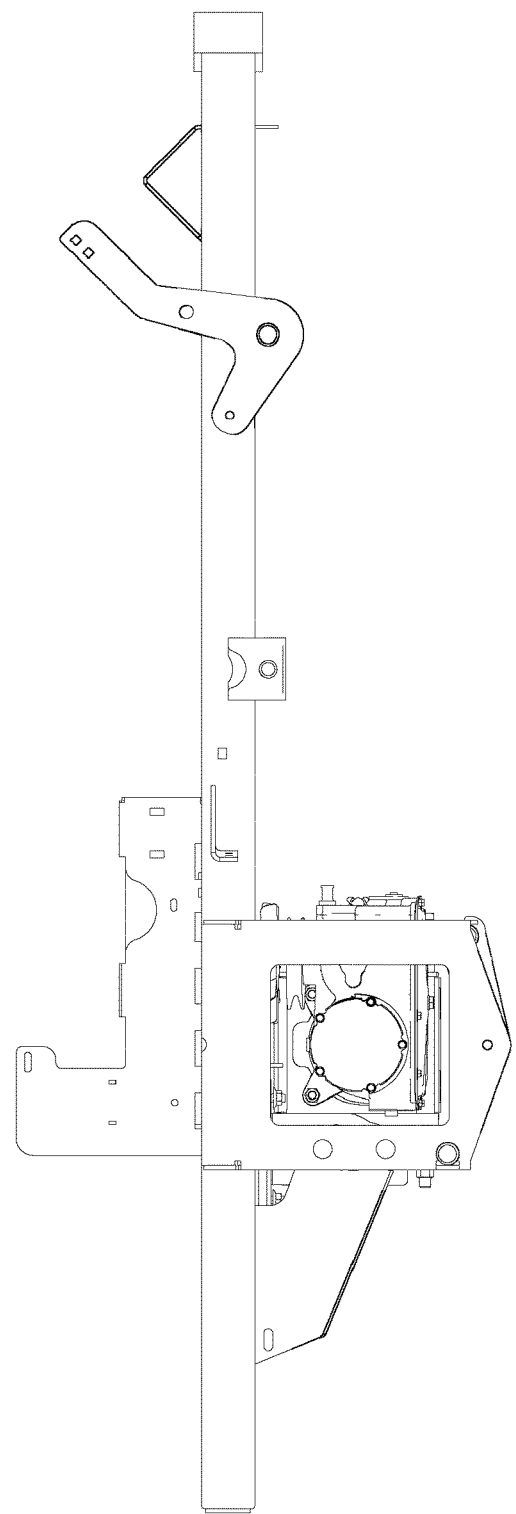
FIG. 10 depicts a left side elevation view of the drive wheel suspension system of FIG. 3.
Figure 11:
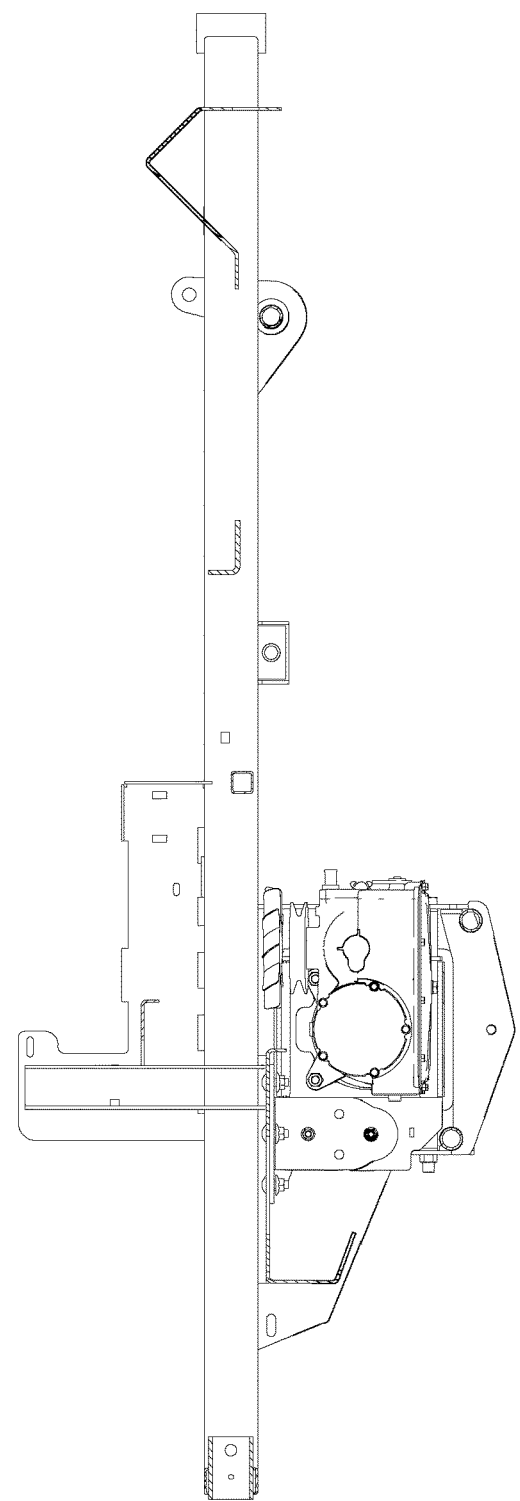
FIG. 11 depicts a cross section view of the drive wheel suspension system of FIG. 3, at plane 11-11 of FIG. 3.
Figure 12:
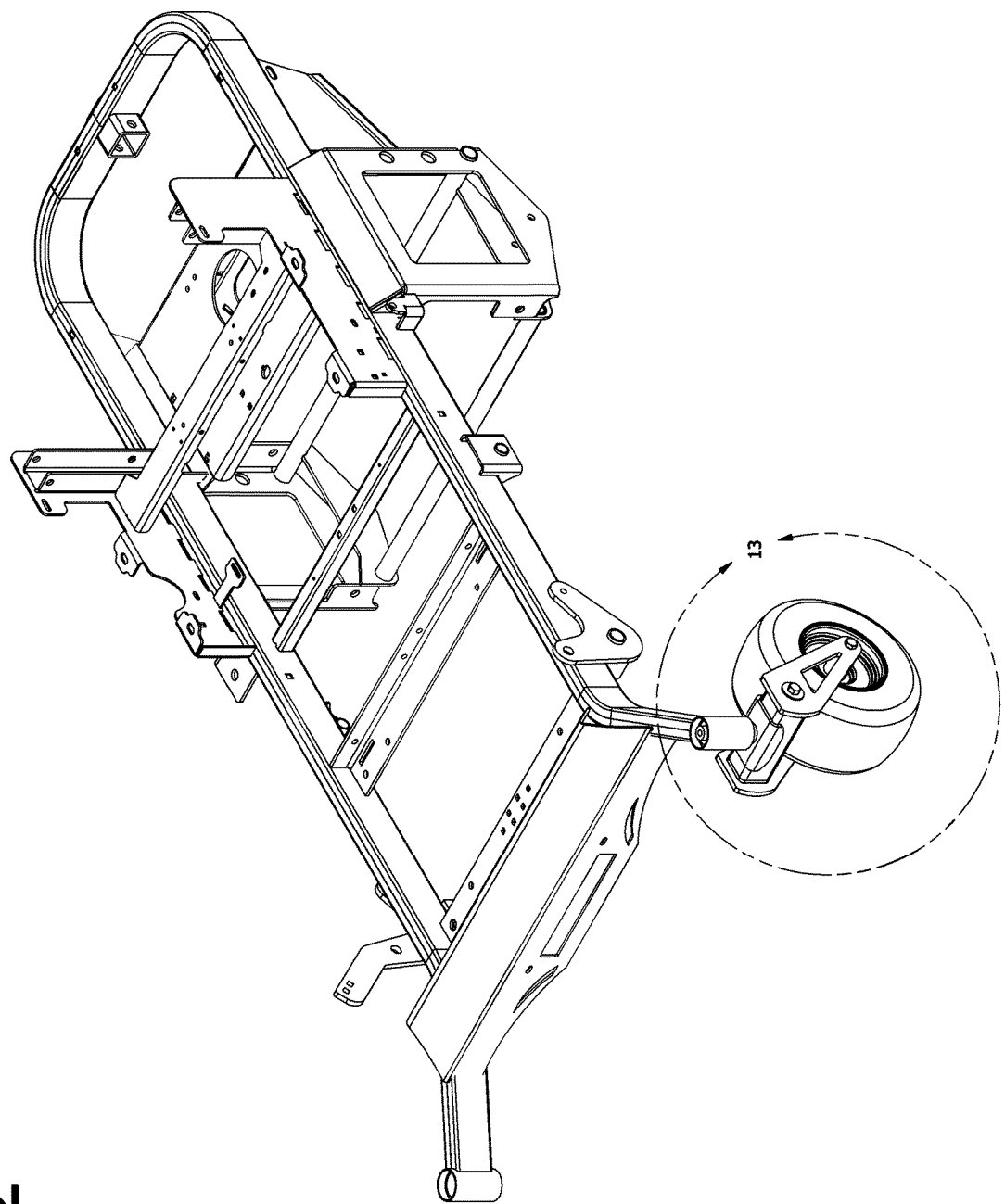
FIG. 12 depicts a perspective view of a representative sample of a vehicle chassis including a left non-motorized wheel suspension system; the companion right wheel suspension is essentially identical to or a mirror image thereof.
Figure 13:
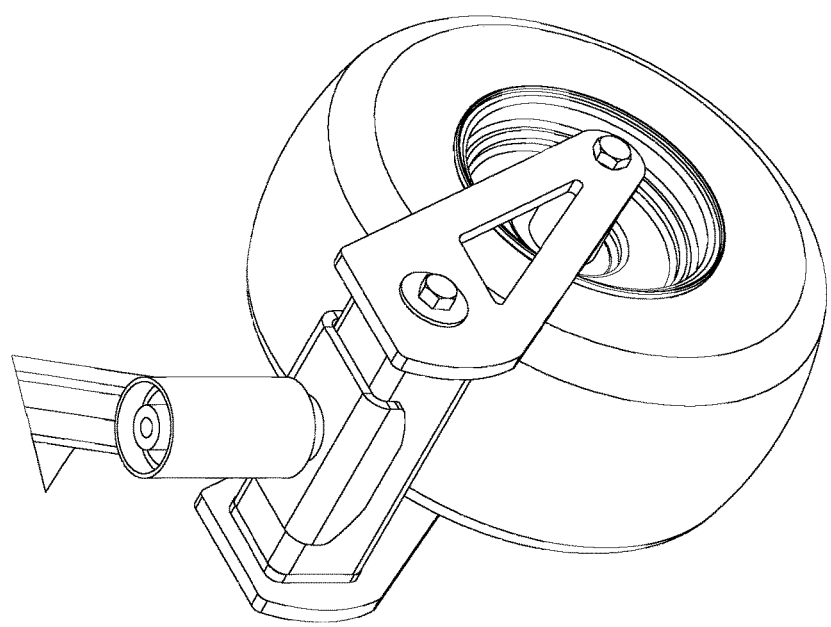
FIG. 13 depicts another perspective view of the material in circle D of FIG. 12.

Referring to FIG. 2, there is an external window-frame (21) anchored beneath the chassis side-rail (24), defining an opening (22) for the driveshaft; it includes opposing downstanding sidewalls with aligned lower apertures (23), which will enable a hinged-like pivotal connection with an interior cradle-frame (25) pivotally nesting within the external window-frame. The housing for the motorized drive axle is mounted to the cradle-frame, with the drive axle extending through both the opening (26) of the interior cradle-frame and the opening of the exterior window-frame. Like the exterior window-frame, the interior cradle-frame includes opposing downstanding sidewalls; however, alignable with the aligned apertures of the window-frame are the ends of a steel tube (27) supported by the sidewalls of the cradle-frame. When the internal cradle-frame nests within the exterior window-frame, a bolt or similar connector may be run through them to join both frames in a pivoting configuration much like a clam shell (but with one shell inverted to nest within the other). In this manner, the wheel assembly may pivot as dictated by wheel displacement caused by travel over uneven or irregular terrain. However, upward displacement is hindered by one or more elastomeric bumpers mounted horizontally beneath the chassis and interior to that pivot point. Downward displacement is hindered by the interface of the frames.

One of the advantages of the drive wheel suspension system disclosed herein is that it allows the use of multiple integrated motor-and-pump systems on multiple drive wheels, such as on left and right drive wheels. Some modern riding mowers and other off-road vehicles use a hydrostatic transmission system. This is a category of engine mechanics, and basically describes a system in which power is generated and transmitted by pressurizing and releasing fluid through specialized pumps. It is also sometimes called "continuously variable transmission," and it works by converting energy harnessed from the movement of fluid through hydraulic pumps to the drive train of a vehicle. This sort of transmission can technically be used to power almost any type of machine, though it has more recently been used for riding mowers and smaller off road vehicles. The transmission has the ability to provide a lot of power very quickly to separate drive wheel motors on separate drive wheels.

In the recent past, some riding mowers have been engineered with separate wheel-motor units, usually sharing a common reservoir and pump system. This requires a number of hoses and other connections that are difficult to maintain, especially when the vehicle is used in rough terrain.

Integrated systems, with a pump and wheel motor combined in one housing, are a relatively new development. Having one integrated unit per wheel assembly eliminates hoses needed for the pumps, and lowers the number of potential leak points. Applicant's drive wheel suspension involves a cradle or frame to which the motor portion of the integrated system is mounted, with the wheel's axle positioned outside the chassis for connection with a wheel. Often each motorized wheel unit has a pulley wheel, and a belt links both and/or a primary motor. The lower edge of the cradle has a pivotal connection with the window-frame formed as a downstanding extension of the chassis, so that vertical displacement of the wheel (as when rolling over bumps) causes the cradle (and attached motor) to pivot on a primarily horizontal plane. Rather than the vertical pivoting provided by a pivot point located towards the center axis of the chassis, the disclosed drive wheel suspension translates up-and-down wheel displacement into side-to-side pulley-wheel displacement rather than vertical pulley displacement. The drive wheel suspension system disclosed herein is positioned on the edge of the chassis and very close to the center of the pulley wheel, so that the amount of side-to-side pivoting allowed by the horizontally mounted shock absorbers is insufficient to result in the de-coupling of the pulley belt typically experienced if vertical wheel displacement also vertically displaces the pulley wheel.

The use of integrated systems provides lower center of gravity, and better traction for inclines, hence their desirability and the utility of the disclosed drive wheel suspension system.

The chassis supports an exterior window-frame (21) beneath its outer edge, in the location of the wheel. There may also be a strut or other strengthening member extending from the left drive wheel window-frame to the right drive wheel window-frame. Each window-frame provides an opening (22) through which a wheel axle will extend. The lower portion of the window-frame also supports a pivotal connection with an interior cradle-frame (25) carrying a motorized transaxle unit so that, through the pivoting, vertical displacement of the wheel occurs with only a relatively small amount of vertical displacement of the motor unit (and associated pulley wheel (28)). The drive wheel suspension system is typically assembled as follows:

The transaxle unit (31) is mounted to the not-yet-hinged interior cradle frame (25); in one embodiment, the cradle frame has holes aligned with mounting holes in the housing of the transaxle unit, with externally threaded fasteners (such as bolts with nuts) being used to join the two. The lower margin of the cradle frame supports a steel tube (27) extending horizontally past the vertical legs of the frame; this tube will form part of the hinge-like connection, and its length is almost the length of distance of the inner portion of the external window-frame, between its aligned holes.

To accomplish the pivotal connection of the two frames, the outer face of the interior cradle-frame is placed into the inner face of the exterior window-frame, until the ends of the tube align with the holes in the lower portion of the window-frame. A bolt (29) is then inserted into one of the window-frame holes, pushed through the cradle-frame tube and out the opposite hole of the window-frame; a locknut is then firmly affixed. A lubricated bushing may be inserted into each end of the tube, to prevent metal-on-metal contact between the bolt or similar connector and the tube, which may cause creaking and unnecessary wear.

The cradle-frame also includes a stop-plate (30) that will interface with the shock absorber(s) when the system is fully assembled. The shock absorbers are mounted beneath the frame, interior to the stop-plate of the cradle-frame. In one embodiment, there is a bracket (41) downstanding from an intermediate portion of a chassis support structure spanning from side to side along the axis of the left and right transaxles. That bracket supports a plurality of horizontally positioned shock absorbers preferably elastomeric cone-like structures (42), defining an open-mouthed cavity having an opposite wall having a mounting hole. In the final step of assembly, the shock absorber(s) are mechanically compressed against the stop-plate, and the assembly is completely tightened.

In an alternative embodiment that bracket supports at least one (and preferably a plurality) of horizontally positioned inner guides (63), each for carrying the interior end of a compression spring or similarly functioning structure (62) impaled in cooperating relationship thereon; the opposite end of the compression spring is impaled in cooperative relationship upon an outer guide (61) anchored to the stop plate (41). Accordingly, the compression spring will essentially be tethered or yoked on the two guides, without being anchored itself. In the final step of assembly, each compression spring is mechanically compressed against the stop-plate, and the assembly is completely tightened.

Besides preventing problems associated with system vibration, such "pre-loading" of the shock absorption system assures that, when the vehicle encounters forces causing upward displacement of the wheels, its drive wheels do not pivot top-inwardly to a harmfully negative wheel camber. (Purely vertical wheels are often considered ideal for some common circumstances, whereas wheels having a top-out orientation (having a positive camber) are considered ideal for some circumstances. Wheels having a top-in configuration, with a negative camber, are generally disfavored.) Applicant prefers that the wheels have a positive camber of between about 1.0 to about 0.75 degrees, when the vehicle is in resting position on the ground. Applicant also prefers that no amount of upward displacement of the drive wheels results in a negative camber of −0.5 degrees for any appreciable amount of time. The arrangement and preloading of the shock absorption/suspension system facilitates this.

Any compression spring or similarly functioning structure may be used that accomplishes the desired amount of dampening or shock absorption.

In general, this suspension system absorbs shock to a motorized driveshaft carried on a chassis frame having a longitudinal left and/or right side-rail perpendicular to the respective driveshaft(s) and supporting each respective wheel assembly, and having an inward span between both side-rails. This suspension system includes a motor-mount cradle comprising a lower portion pivotally attached beneath the chassis and cradling the driveshaft motor directly above. The cradle also includes a shock absorber comprising an inward end anchored beneath the span inward of said pivotal attachment, and an opposite end adjacent a stop portion of the motor-mount cradle. The shock absorber may include an elastomeric bumper defining a cavity terminating in an inward wall including an aperture accepting an anchoring fastener.

The pivotal attachment of the motor-mount cradle beneath the chassis allows the motorized drive shaft to pivot from a resting position, with 1.5 degrees of camber (wheel top out), to about −0.5 degrees of camber (wheel top in). The shock absorbers impede or limit the upward movement of the wheels.

The cradle may include:

(a) an external window-frame anchored beneath the chassis side-rail, defining an opening for the driveshaft and comprising opposing downstanding sidewalls including aligned lower apertures; and (b) an interior cradle-frame pivotally nesting within said external window-frame, defining an opening for the driveshaft, and comprising opposing downstanding sidewalls defining apertures supporting a steel tube having opposite ends aligning with said aligned lower apertures of said external window-frame, and further comprising a bolt or similar connector transversing between said aligned lower apertures of said external window-frame and said ends of said tube of said internal cradle-frame, to pivotally connect both frames.

The stop portion of the motor-mount cradle may include a stop-plate parallel to said bolt or similar connector.

Besides the two aforementioned suspension systems for wheel assemblies, another disclosed invention includes a suspension system absorbing shock to the occupant of a vehicle having a seat cushion fastened atop a seat plate and having that seat assembly supported upon a chassis mount. One embodiment of the invention disclosed herein positions elastomeric shock absorbers (51) near the pivot point of the seat, and allows drivers to adjust the seat according to the driver's weight (in the range of up to about 300 pounds). Closeness to the pivot point (hinge) allows relative short-distance adjustment of the positioning of the shock absorber(s) to greatly change the weight-bearing capability of the seat while retaining its shock absorption. Such suspension system includes an elastomeric shock absorber having a downstanding base fastener (54); the chassis mount includes a panel (56) in substantially parallel plane beneath said seat plate and having a slot (57) extending front-to-rear along an intermediate portion of said panel and accepting said shock absorber base fastener. (However, in one embodiment, that substantially parallel mount includes a slight incline (58) from front to back.) The suspension system may include a plurality of elastomeric shock absorbers, each having a downstanding base fastener; the chassis mount may include a panel in substantially parallel plane beneath said seat plate and having a corresponding plurality of parallel slots extending front-to-rear along an intermediate portion of said panel, each of said slots accepting said base fastener of a respective shock absorber.

The elastomeric shock absorber may include a bumper defining a cavity terminating in base wall (52) which includes an aperture (53) accepting an anchoring fastener.

The seat plate may include an edge pivotally attached to said chassis.

The suspension system may further include an adjustment means (55) of adjusting the front-to-rear position of said elastomeric shock absorber, such as nut rotatably engageable with the threads of an anchor bolt. Other adjustment means may include a wing nut or knob. Moving the shock absorber(s) forwardly or rearwardly also adjusts the height of the suspension, because the mounting bracket has an upward/downward incline.

Besides the separate shock absorption systems described above, the disclosed invention includes a vehicle having one or more of said systems. Riding lawn mowers are examples of such vehicle, along with UTVs and ATVs.

In one embodiment, the vehicle has a suspension system absorbing shock to a motorized driveshaft carried on a chassis frame having a longitudinal left and/or or right side-rail perpendicular to the respective driveshaft(s) and supporting each respective wheel assembly, and having an inward span between both side-rails. The suspension system includes:

(a) a cradle includes a lower portion pivotally attached beneath the chassis and cradling the driveshaft motor directly above, and a stop portion; and (b) a shock absorber includes an inward end anchored beneath the span inward of said pivotal attachment, and an opposite end adjacent said stop portion.

Additionally or in the alternative, the vehicle may include a suspension system absorbing shock to a wheel assembly carried on the chassis frame having a longitudinal left or right side-rail supporting each respective wheel assembly. The suspension system may include a sleeve housing an elastomeric insert defining a non-round bore therethrough, and a non-round core snugly received within said bore and includes opposing non-round ends protruding from said sleeve; said suspension system further may include a pair of downstanding struts having lower ends fastened to the axle-hub of the wheel rotatable thereon, each of said struts having an upper end having an aperture sized to snugly receive and anchor a respective non-round end of said core protruding from said sleeve.

Additionally or in the alternative to one or more of the systems identified immediately above, the vehicle may include a suspension system absorbing shock to the occupant of a vehicle having a seat cushion fastened atop a seat plate and having that seat assembly supported upon a chassis mount. The suspension system may include an elastomeric shock absorber having a downstanding base fastener. The chassis mount may include a panel in substantially parallel plane beneath said seat plate and having a slot extending front-to-rear along an intermediate portion of said panel and accepting said shock absorber base fastener.

It should be recognized, particularly by those skilled in the art, that differences in the structures described may be adopted, without a material change in the function or operation of the vehicle, or departure from the disclosed invention as described in the accompanying claims.

We claim:

1. A suspension system absorbing shock to a wheel assembly carried on a chassis frame having a longitudinal side-rail perpendicular to an axle and supporting the wheel assembly, and the chassis frame having an inward span between the side-rail and an opposite side of the chassis frame, the suspension system comprising a shock absorber aligned horizontally between an inner portion of the wheel assembly and an intermediate portion of the inward span, and comprising a laterally pivoting connection between a lower portion of the wheel assembly and the chassis frame whereby upward displacement of the wheel assembly caused by traversing a bump causes inward pivoting of the wheel assembly against said shock absorber.

2. A suspension system described in claim 1, said laterally pivoting connection comprising:
   (a) a cradle comprising a lower portion including the laterally pivoting connection beneath the side-rail and cradling the wheel assembly above the laterally pivoting connection, and comprising a stop portion; and
   (b) the horizontally-oriented shock absorber comprising an inward end aligned beneath the inward span inward of said laterally pivoting connection, and an opposite end aligned adjacent said stop portion.

3. A suspension system described in claim 2, said shock absorber comprising an elastomeric bumper defining a cavity terminating in an inward wall including an aperture accepting an anchoring fastener for aligning said inward end beneath the inward span inward of the laterally pivoting connection.

4. A suspension system described in claim 2, said shock absorber comprising a compression spring defining a cavity including an aperture at said inward end accepting an anchoring fastener for aligning said inward end beneath the inward span inward of the laterally pivoting connection.

5. A suspension system described in claim 4, said shock absorber comprising the compression spring defining a cavity having an inner end opening and an outer end opening, said system further comprising a bracket downstanding beneath the inward span inward of the laterally pivoting connection and an inner guide anchored to said bracket and protruding into said inner end opening, and further comprising an outer guide anchored inwardly to said stop portion of said cradle and protruding into said outer end opening.

6. A suspension system described in claim 2, said laterally pivoting connection of said cradle beneath the chassis frame allowing a motorized drive shaft to pivot from a position having a wheel camber in the range of about 1.5 degrees to not less than about –0.5 degrees.

7. A suspension system described in claim 2, said cradle comprising:
   (a) an external window-frame anchored beneath the side-rail, defining an opening for the axle and comprising opposing downstanding sidewalls including aligned lower apertures;
   (b) an interior cradle-frame pivotally nesting within said external window-frame, defining an opening for the axle, and comprising opposing downstanding sidewalls defining lower apertures supporting a tube having opposite ends aligning with said aligned lower apertures of said external window-frame, and further comprising a connector transversing traversing between said aligned lower apertures of said external window-frame and said tube of said internal cradle-frame to pivotally connect said frames.

8. A suspension system described in claim 2, said stop portion comprising a stop-plate opposing said lateral pivoting of said laterally pivoting connection l.

9. A suspension system described in claim 1 wherein said wheel assembly comprises a motorized drive shaft.

10. A suspension system described in claim 1, said chassis frame supporting a plurality of said wheel assemblies, each such wheel assembly supported by a separate suspension system.

11. A suspension system absorbing shock to a motorized driveshaft of a wheel assembly carried on a chassis frame having a longitudinal side-rail and having an inward span between the side-rail and another side of the chassis frame, the suspension system comprising:
   (a) a cradle comprising a lower portion having a laterally pivoting connection beneath the side-rail and cradling a motor of the motorized driveshaft above the laterally pivoting connection, and comprising a stop portion; and
   (b) a shock absorber comprising an inward end positioned beneath the inward span inward of the laterally pivoting connection, and an opposite outer end positioned adjacent the stop portion.

12. A suspension system described in claim 11, said shock absorber comprising an elastomeric bumper defining a cavity terminating at said inward end in an inward wall including an aperture accepting an anchoring fastener for said positioning beneath the inward span.

13. A suspension system described in claim 11, said shock absorber comprising a compression spring defining a cavity including an opening at said inward end accepting an anchoring fastener for said positioning beneath the inward span.

14. A suspension system described in claim 11, said shock absorber comprising a compression spring defining a cavity including an inner end opening and an outer end opening, said system further comprising a bracket downstanding beneath the inward span inward of the laterally pivoting connection and an inner guide anchored to said bracket and protruding into said inner end opening, and further comprising an outer guide anchored inwardly to said stop portion of said cradle and protruding into said outer end opening.

15. A suspension system described in claim 11, said cradle comprising:
   (a) an external window-frame anchored beneath the side-rail, defining an opening for the driveshaft and comprising opposing downstanding sidewalls including aligned lower apertures;
   (b) an interior cradle-frame pivotally nesting within said external window-frame, defining an opening for the driveshaft, and comprising opposing downstanding sidewalls defining lower apertures supporting a tube having opposite ends aligning with said aligned lower apertures of said external window-frame, and further comprising a connector traversing between said aligned lower apertures of said external window-frame and said tube of said internal cradle-frame to pivotally connect said frames.

16. A suspension system described in claim 11, said stop portion comprising a stop-plate parallel to the laterally pivoting connection.

17. A suspension system described in claim 11, said chassis frame supporting a plurality of said wheel assemblies, each such wheel assembly supported by a separate suspension system.

* * * * *

UNITED STATES PATENT AND TRADEMARK OFFICE
CERTIFICATE OF CORRECTION

| | | |
|---|---|---|
| PATENT NO. | : 10,525,783 B1 | Page 1 of 1 |
| APPLICATION NO. | : 15/701659 | |
| DATED | : January 7, 2020 | |
| INVENTOR(S) | : Robert N. Foster et al. | |

It is certified that error appears in the above-identified patent and that said Letters Patent is hereby corrected as shown below:

On the Title Page

Item (72) Inventors:
The second listed inventor 'Adam E. Branscum' should read -- Adam W. Branscum --

Signed and Sealed this
Fifteenth Day of August, 2023

Katherine Kelly Vidal
*Director of the United States Patent and Trademark Office*